United States Patent
DeJarnette et al.

(10) Patent No.: US 11,582,925 B2
(45) Date of Patent: Feb. 21, 2023

(54) SYSTEM FOR WATERING LIVE PLANTS ON A MANEUVERABLE RACK

(71) Applicant: Walmart Apollo, LLC, Bentonville, AR (US)

(72) Inventors: Timothy Ryan DeJarnette, Fayetteville, AR (US); Kevin Reed, Bentonville, AR (US); Nicholas Hoyne, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1161 days.

(21) Appl. No.: 16/165,787

(22) Filed: Oct. 19, 2018

(65) Prior Publication Data
US 2020/0037521 A1     Feb. 6, 2020

Related U.S. Application Data

(60) Provisional application No. 62/712,846, filed on Jul. 31, 2018.

(51) Int. Cl.
*A01G 27/00*     (2006.01)
*B05B 12/00*     (2018.01)

(52) U.S. Cl.
CPC .......... *A01G 27/003* (2013.01); *B05B 12/004* (2013.01); *Y10S 901/01* (2013.01)

(58) Field of Classification Search
CPC . A01G 9/00; A01G 9/02; A01G 9/023; A01G 9/08; A01G 9/081; A01G 9/083;
(Continued)

(56) References Cited

U.S. PATENT DOCUMENTS

| 6,068,773 A * | 5/2000 | Sheaffer | C02F 3/00 210/149 |
| 9,433,158 B2 | 9/2016 | Nagadome et al. | |

(Continued)

FOREIGN PATENT DOCUMENTS

| CN | 203759814 U | 8/2014 |
| CN | 205408947 U | 8/2016 |

(Continued)

OTHER PUBLICATIONS

Young, Lee W, "International Search Report", International Application No. PCT/US2019/042727, dated Oct. 3, 2019, 2 pages.
(Continued)

*Primary Examiner* — Adam R Mott
*Assistant Examiner* — Erick T. Detweiler
(74) *Attorney, Agent, or Firm* — Barta, Jones & Foley, PLLC

(57) ABSTRACT

Examples provide a system for watering plants on a rack. A robotic device attaches to a portion of the rack and pulls or pushes the rack to a watering zone. A sprinkler device sprays water to evenly distribute water across all plants on the rack. The system determines quantity of water, duration of watering, and frequency of watering based on real-time sensor data and context data associated with the environment, historical watering data, condition of the plants on the rack and a set of customized maintenance rules based on the type of plants on the rack. When watering is complete, the robotic device returns the rack to a designated location and detaches from the rack. The robotic device then attaches to another rack having plants on it scheduled for watering. The watering schedule is updated dynamically based on changing weather and plant state.

20 Claims, 14 Drawing Sheets

(58) Field of Classification Search
CPC ........ A01G 9/085; A01G 9/086; A01G 9/088; A01G 9/24; A01G 9/26; A01G 9/247; A01G 9/249; A01G 9/28; A01G 13/02; A01G 13/025; A01G 25/02; A01G 25/023; A01G 27/00; A01G 27/001; A01G 27/02; A01G 27/003; A01G 27/04; A01G 27/06; A01G 27/005; A01G 27/006; A01G 27/008; A01G 31/02; B05B 12/00; B05B 12/02; B05B 12/04; B05B 12/004; B05B 12/006; B05B 12/008; B05B 12/08; B05B 12/10; B05B 12/12; B05B 12/122; B05B 12/124; B05B 12/126; B05B 12/081; B05B 12/084; B05B 12/085; B05B 12/087; B05B 12/1427; B05B 12/1436; B05B 12/1454; B05B 12/1463; B05B 12/16; B05B 12/20; B05B 12/22; B05B 13/00; B05B 13/04; B05B 13/0405; B05B 13/041; B05B 13/0415; B05B 13/0421; B05B 13/0426; B05B 13/0431; B05B 13/0442; B05B 13/0447; B05B 13/0457; B05B 13/0463; B05B 13/0468; B05B 13/0473; B05B 13/0478; B05B 13/0484; B05B 13/0489; B05B 13/0494; B05B 13/0221; B05B 13/0257; B05B 13/0228; B05B 13/0235; B05B 13/0242; B05B 13/0264; B05B 13/0271; B05B 13/0285; B05B 13/0292; B05B 16/00; B05B 16/25; B05B 16/80; B05B 16/90; B05B 16/95; Y10S 901/00; Y10S 901/01; Y10S 901/02; Y10S 901/46; Y10S 901/47; Y10S 901/50

See application file for complete search history.

(56) References Cited

U.S. PATENT DOCUMENTS

| | | | |
|---|---|---|---|
| 10,124,711 B1 * | 11/2018 | Hall | A01K 1/0236 |
| 11,172,779 B1 * | 11/2021 | Munoz | A47G 33/12 |
| 2008/0046130 A1 | 2/2008 | Faivre | |
| 2009/0056219 A1 * | 3/2009 | Csoke | A01G 27/02 47/79 |
| 2009/0320363 A1 * | 12/2009 | Matlen | A47G 7/047 47/65.5 |
| 2012/0065772 A1 | 3/2012 | Dyas | |
| 2013/0325159 A1 | 12/2013 | Kilibarda et al. | |
| 2014/0115958 A1 | 5/2014 | Helene et al. | |
| 2014/0173769 A1 | 6/2014 | Leyns et al. | |
| 2015/0000191 A1 * | 1/2015 | Nagadome | A01G 9/00 47/66.6 |
| 2015/0014440 A1 | 1/2015 | Nagadome et al. | |
| 2015/0230417 A1 | 8/2015 | Nickerson et al. | |
| 2015/0282437 A1 | 10/2015 | Ohara et al. | |
| 2017/0042101 A1 * | 2/2017 | Soltani | A01G 27/005 |
| 2018/0295783 A1 * | 10/2018 | Alexander | A01G 7/00 |

FOREIGN PATENT DOCUMENTS

| | | |
|---|---|---|
| CN | 206209987 U | 5/2017 |
| CN | 207274826 U | 4/2018 |
| DE | 10343804 A1 | 4/2005 |
| JP | 5441874 B2 | 3/2014 |
| WO | 2018002647 A1 | 1/2018 |

OTHER PUBLICATIONS

Young, Lee W, "Written Opinion", International Application No. PCT/US2019/042727, dated Oct. 3, 2019, 6 pages.

* cited by examiner

SYSTEM FOR WATERING LIVE PLANTS ON A MANEUVERABLE RACK

BACKGROUND

In a garden center or other plant nursery, there are frequently dozens or even hundreds of different types of plants to be maintained. Each type of plant frequently requires varying amounts of sun exposure, soil moisture levels, soil acidity (pH), watering frequency, fertilizer requirements and/or soil composition for maintenance, health and growth of the plants. Managing these diverse maintenance requirements for every type of plant on an individual basis is typically too time consuming, cost prohibitive and impractical in large-scale garden centers. In some solutions, plants are watered simultaneously/uniformly by water sprinklers spread throughout the garden center. This automated watering regime may lead to overwatering of some plants and underwatering of others, resulting in sub-optimal condition of plants and inefficient resource usage in plant maintenance.

SUMMARY

Some examples provide a system for watering plants on a maneuverable rack. The system includes plants associated with a maneuverable plant rack in a live plant center. The plant rack includes a set of wheels connected to an underside of a shelf member. An attachment point is located on a portion of the shelf member. A robotic rack-driver device moves the plant rack to a watering zone of a frame-mounted sprinkler device. The robotic rack-driver device includes an attachment mechanism removably connected to the attachment point on the plant rack. A motor provides drive power to one or more wheels on the robotic rack-driver device. The robotic rack-driver device drives the plant rack along a pre-determined route from an assigned location of the plant rack to the watering zone. A control device on the robotic rack-driver device includes a processor communicatively coupled to a memory. A controller component is implemented on the processor. The controller component analyzes sensor data generated by one or more sensor devices and real-time context data associated with the live plant center. The controller component identifies a current state of at least one plant on the plant rack based on a result of the analysis. A plant maintenance component implemented on the processor generates a set of maintenance instructions for watering the plants on the plant rack. A set of one or more sensor devices on the frame-mounted sprinkler device detects a presence of the plant rack within the watering zone. A sprinkler control component implemented on the frame-mounted sprinkler device triggers release of a quantity of water onto the plant rack via a set of sprinklers for a predetermined watering duration specified in the set of maintenance instructions.

Other examples provide a computer-implemented method for dynamically scheduling watering of plants on a maneuverable plant rack. A set of one or more sensor devices generates sensor data associated with at least one plant on a selected plant rack in a live plant center. An analysis component analyzes the sensor data and real-time context data associated with the live plant center using a set of status criteria. An updated status of the at least one plant on the selected plant rack is generated based on the results of the analysis. A plant maintenance component updates a set of watering instructions for the selected plant rack based on the updated status. The updated set of watering instructions includes a next scheduled watering time, a quantity of water and a duration of watering for the next scheduled watering time of the plant rack. A navigation component on the robotic rack-driver device generates a set of navigation instructions. The robotic rack-driver device autonomously drives the selected plant rack from an assigned location to a watering zone associated with a selected frame-mounted sprinkler device at the next scheduled watering time based on the set of navigation instructions. When a sensor device on the robotic rack-driver device detects release of water onto the selected plant rack within the watering zone, the navigation component initiates a set of rotational motions maneuvering the selected plant rack within the watering zone to enable equal water distribution across the selected plant rack. The robotic rack-driver device returns the selected plant rack to the assigned location of the plant rack when the sensor detects a cessation of water emissions from the rack-mounted sprinkler device.

Still other examples provide a robotic rack-driver device. An analysis component implemented on at least one processor on the robotic rack-driver device analyzes sensor data associated with a live plant center and real-time context data associated with a plurality of maneuverable plant racks using a set of plant maintenance rules to identify a selected plant rack for watering. An attachment mechanism on the robotic rack-driver device couples to an attachment point on a portion of the selected plant rack. An electric motor provides drive power to at least one wheel on the robotic rack-driver device. The robotic rack-driver device moves the selected plant rack from an assigned location of the selected plant rack to a watering zone associated with a selected frame-mounted sprinkler device. A navigation component generates instructions to move the selected plant rack through a set of rotational motions within the watering zone when the frame-mounted sprinkler device begins releasing water onto the selected plant rack. The robotic rack-driver device returns the selected plant rack to the assigned location on condition a duration watering assigned to the selected plant rack is completed. The attachment mechanism releases a locking mechanism to release the portion of the selected plant rack from the robotic rack-driver device at the assigned location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some examples, . . . " For brevity and clarity of presentation, this implied leading clause is not repeated ad nauseum.

Referring to the figures, examples of the disclosure enable watering plants on a maneuverable rack via a robotic rack-driver device and a frame-mounted sprinkler device. In some examples, the robotic rack-driver device autonomously identifies a rolling rack containing one or more plants scheduled for watering. The robotic rack-driver device attaches/latches onto the rack and pulls or pushes the rack into a plant watering zone associated with one or more sprinkler devices, such as, but not limited to, a frame-mounted sprinkler device. When the sprinkler device(s) finish watering the plants on the rack, the rack-driver device automatically returns the rack of plants to a correct/assigned location within a plant nursery/garden center. This enables more efficient plant watering while improving quality of plant maintenance.

In other examples, the system uses sensor data regarding the condition of plants on a rack to determine when the plants on the rack should be watered, relocated to a warmer/protected area when there is a danger of frost, removing/culling damaged, wilted or out-of-season plants, etc. The system provides the robotic rack-driver device with instructions to move a plant rack into the watering zone for watering and/or removed to a different location based on the condition of the plant(s) on the rack. This improves utilization of plant watering resources, improves efficiency of plant maintenance and reduces water usage.

Figure 1:
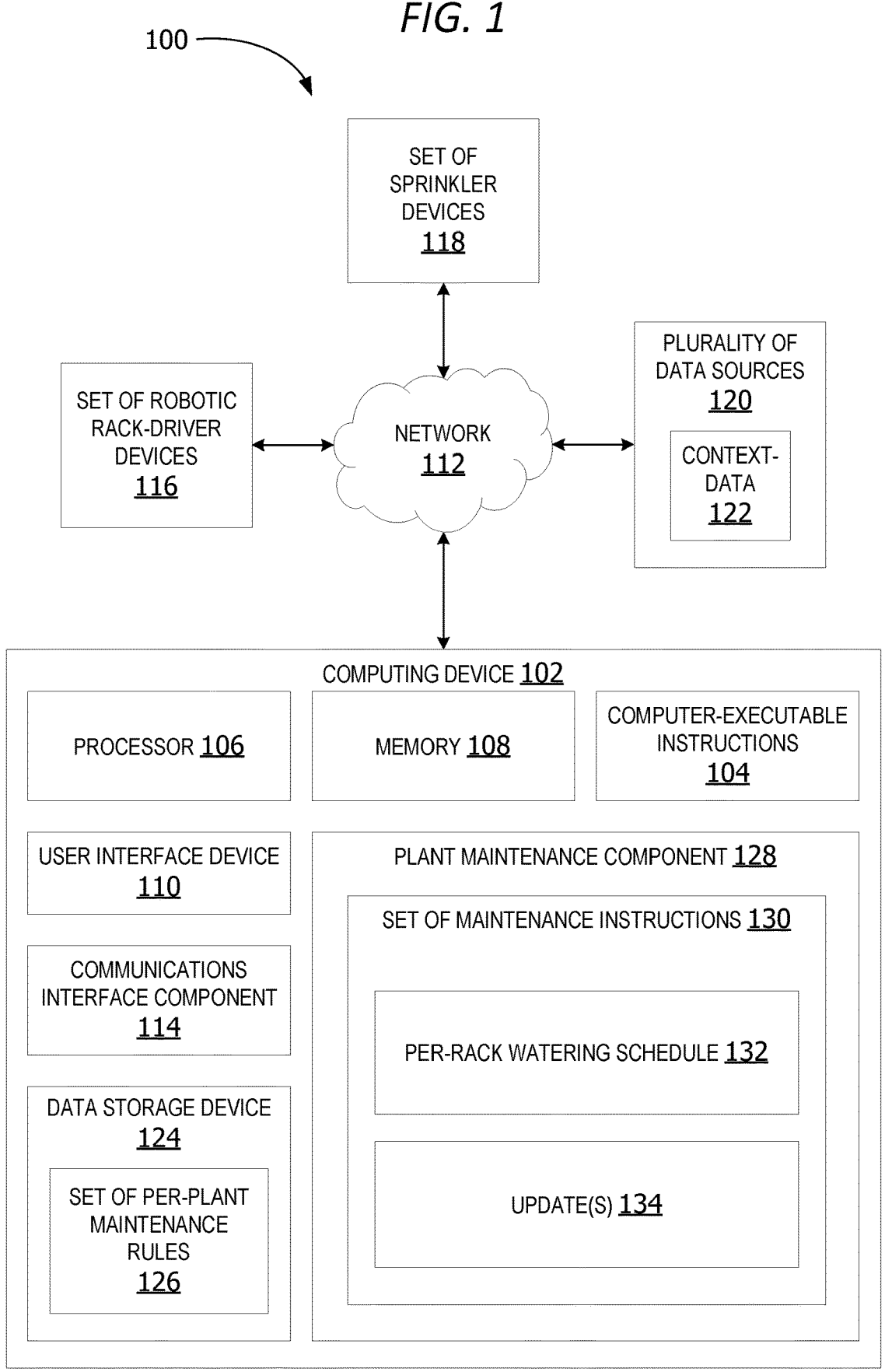
FIG. 1 is an exemplary block diagram illustrating a system for watering plants on a maneuverable rack via a robotic rack-driver device and a frame-mounted sprinkler device.

Referring again to FIG. 1, an exemplary block diagram illustrates a system 100 for watering plants on a maneuverable rack via a robotic rack-driver device and a frame-mounted sprinkler device. In the example of FIG. 1, the computing device 102 represents any device executing computer-executable instructions 104 (e.g., as application programs, operating system functionality, or both) to implement the operations and functionality associated with the computing device 102. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as servers, desktop personal computers, kiosks, or tabletop devices. The computing device 102 in other examples may be implemented on a cloud server, such as the cloud server 1400 in FIG. 14. Additionally, the computing device 102 may represent a group of processing units or other computing devices.

In some examples, the computing device 102 has at least one processor 106 and a memory 108. The computing device 102 may also include a user interface device 110.

The processor 106 includes any quantity of processing units and is programmed to execute the computer-executable instructions 104. The computer-executable instructions 104 may be performed by the processor 106 or by multiple processors within the computing device 102 or performed by a processor external to the computing device 102. In some examples, the processor 106 is programmed to execute instructions such as those illustrated in the figures (e.g., FIG. 16 and FIG. 17).

The computing device 102 further has one or more computer-readable media such as the memory 108. The memory 108 includes any quantity of media associated with or accessible by the computing device 102. The memory 108 may be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications may communicate with counterpart applications or services such as web services accessible via a network 112. For example, the applications may represent downloaded client-side applications that correspond to server-side services executing in a cloud.

In other examples, the user interface device 110 includes a graphics card for displaying data to the user and receiving data from the user. The user interface device 110 may also include computer-executable instructions (e.g., a driver) for operating the graphics card. Further, the user interface device 110 may include a display (e.g., a touch screen display or natural user interface) and/or computer-executable instructions (e.g., a driver) for operating the display. The user interface device 110 may also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user may input commands or manipulate data by moving the computing device 102 in one or more ways.

The network 112 is implemented by one or more physical network components, such as, but without limitation, routers, switches, network interface cards (NICs), and other network devices. The network 112 may be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 may be a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices may occur using any protocol or mechanism over any wired or wireless connection. In some examples, the communications interface component 114 is operable with short range communication technologies such as by using near-field communication (NFC) tags.

In at least some examples, the communications interface component 114 enables communications between the computing device 102 and other devices, such as but not limited to a set of one or more robotic rack-driver devices 116 for moving racks of plants around a plant center, a set of one or more sprinkler devices 118 for spraying water onto plant racks and/or a plurality of data sources 120 providing real-time context data 122 associated with the plant center.

The plurality of data sources provides the real-time context data 122 associated with one or more plants in the live plant center, one or more plant racks within the live plant center, one or more areas of the live plant center, the conditions within the live plant center and/or the conditions/weather surrounding the live plant center. The plurality of data sources 120 in some examples includes, without limitation, one or more news feeds, one or more weather feeds and/or access to one or more shipping and receiving databases/records. A shipping and receiving database/record includes data associated with expected dates and/or times of arrival of a delivery or shipment of plants, inventory of plants to be delivered on a specific date, delays associated with an expected delivery/shipment of plants or any other data associated with orders of plants to be delivered or shipped to the live plant center.

The system 100 may optionally include a data storage device 124 for storing data, such as, but not limited to a set of per-plant maintenance rules 126. The set of per-plant maintenance rules 126 includes one or more rules for maintaining a specific plant or a type of plant. For example, the per-plant maintenance rules 126 may include a rule specifying that succulent plants are to be watered one time per week until the soil in each pot/container is thoroughly soaked and water begins to run out through the drain holes.

The data storage device 124 may include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database.

The data storage device 124 in this example is included within the computing device 102 or associated with the computing device 102. In other examples, the data storage device 124 may be a remote data storage accessed by the computing device via the network 112, such as a remote data storage device, a data storage in a remote data center, or a cloud storage.

The memory 108 in some examples stores one or more computer-executable components. Exemplary components include a plant maintenance component 128 that is executed by the processor 106 of the computing device 102. The plant maintenance component 128 generates a set of maintenance instructions 130 for watering one or more plants on a selected plant rack.

A plant rack is a rolling device for displaying and/or transporting plants. A plant rack may include one or more shelves. In other examples, a plant rack may be a rolling dolly or rolling platform for transporting trays of small plants or large/tall plants.

The set of maintenance instructions includes a per-rack watering schedule 132. The per-rack watering schedule 132 includes instructions for watering plant(s) on a selected plant rack. The watering instructions may include a next scheduled watering time, a quantity of water and/or a duration of watering for the next scheduled watering time of the plant rack.

In other examples, the plant maintenance component 128 performs one or more update(s) 134 of a pre-existing set of maintenance instructions. The update(s) 134 are performed in response to changes in context data and/or changes in sensor data indicating an increase or decrease in watering of plant(s) on a one or more plant racks. For example, a change in sensor data and/or context data may indicate changes in status/condition of one or more plants on a rack, a change in weather/temperature, a change in delivery/shipping schedule, etc.

In this non-limiting example, the plant maintenance component is executed on the computing device 102. In other example, the plant maintenance component 128 may be implemented on one or more of the robotic rack-driver devices and/or the rack-sprinkler devices. In other words, the analytics performed by the plant maintenance component may be performed entirely on a robotic rack-driver device or the analytics may be performed by two or more robotic rack-driver devices sharing the processor load. In these example, a load balancer may be utilized to divide the processing load among the robotic rack-driver devices and/or one or more rack-sprinkler devices.

Figure 2:
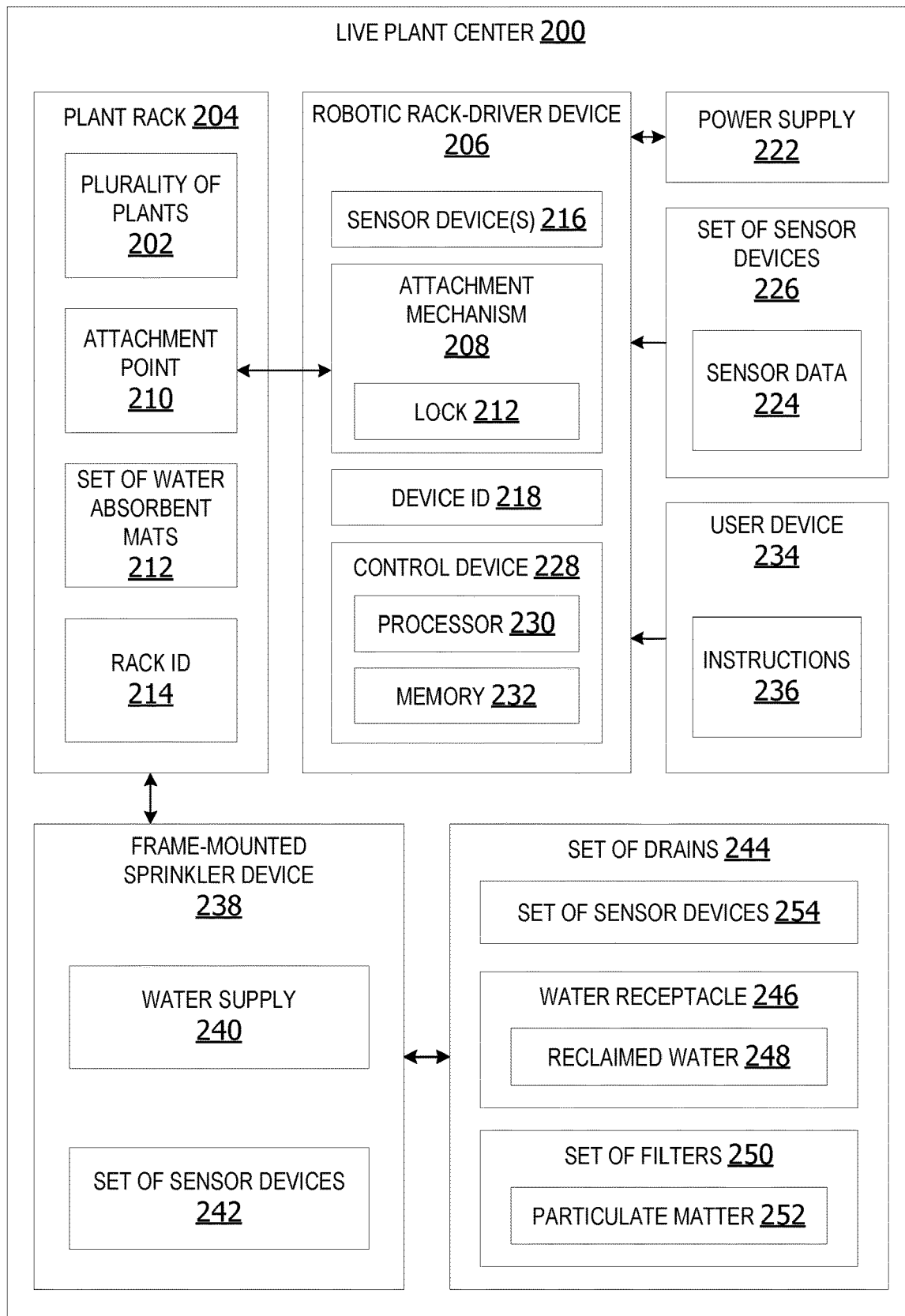
FIG. 2 is an exemplary block diagram illustrating a live plant center including at least one robotic rack-driver device and at least one sprinkler device.

FIG. 2 is an exemplary block diagram illustrating a live plant center 200 including at least one robotic rack-driver device and at least one sprinkler device. The live plant center 200 is a plant nursery, a garden center or other retail location storing a plurality of plants 202 on a set of one or more plant racks, such as, but not limited to, the plant rack 204. The plant rack 204 is maneuverable. The plant rack includes one or more rollers (wheels) enabling the plant rack to be pulled, pushed or otherwise moved by a robotic rack-driver device 206.

The robotic rack-driver device 206 is an autonomous robotic device including an attachment mechanism 208 that latches onto an attachment point 210 on the plant rack 204. The attachment point is a device or portion of a device configured to complement/conform with the attachment mechanism on the robotic rack-driver device.

When the attachment mechanism 208 engages the attachment point 210, the attachment mechanism activates a lock 212 to prevent the plant rack 204 from detaching from the robotic rack-driver device 206 before the robotic rack-driver device 206 releases it.

The robotic rack-driver device 206 selects a specific plant rack based on a rack identifier (ID) 214 on each plant rack. The rack ID 214 is an identifier distinguishing the plant rack 204 from other plant racks. The rack ID 214 may be implemented as a universal product code (UPC), a matrix barcode, a quick response (QR) code, a radio frequency identifier (RFID) tag, a label, or any other type of barcode or identifier. The robotic rack-driver device 206 in this example scans the rack ID 214 using one or more sensor device(s) 216. The sensor device(s) 216 may include, without limitation, a barcode reader, a camera for capturing an image of the rack ID 214, an RFID tag reader, a QR code reader, or any other type of device for reading the rack ID 214.

The robotic rack-driver device 206 may optionally include a device ID 218 identifying the robotic rack-driver device 206. A user or other smart device scans/reads the device ID 218 to identify a selected robotic rack-driver device if there are two or more robotic rack-driver devices in the live plant center 200.

The plant rack 204 includes a set of one or more water absorbent mats 220 in some examples. The plurality of plants 202 on the plant rack 204 are arranged on one or more shelves. Each shelf in this non-limiting example includes a water absorbent mat laying on a surface of the shelf. One or more plants are placed on top the mat on a shelf. When the plants on the rack are watered, the water is sprayed onto the water absorbent mat. The mat holds the water, which is absorbed through one or more holes in the plant pot/container. In this manner, the plants are watered via the set of water absorbent mats rather than spraying the water across the top of the plants or pouring the water into the pot/container for each plant.

The robotic rack-driver device 206 may optionally be powered or recharged via a poser supply 222. The power supply may be implemented as a set of batteries, an electrical power source, one or more solar panels attached to the robotic rack-driver device 206, or any other power source.

The robotic rack-driver device 206 in this example generates sensor data via one or more sensor devices on the robotic rack-driver device 206. In other examples, the robotic rack-driver device 206 may receive sensor data 224 from a set of one or more sensor devices 226 within the live plant center 200. The sensors in the set of sensor devices 226 may be located on plant displays, plant racks, walls, ceilings, on point-of-sale (POS) devices or located anywhere else within the live plant center. A plant display may include a hanging plant display, a table or other fixture on which plants are resting, a bin, a shelf, a cabinet, a counter, or any other display.

In this example, the robotic rack-driver device 206 includes a control device 228 including a memory 232 communicatively coupled to a processor 230. The processor optionally executes a plant maintenance component for generating maintenance instructions, such as, but not limited to, the plant maintenance component 128 in FIG. 1. The instructions may identify a plant rack for watering, identify a date and/or time for watering plants on the plant rack and/or instructions to move the plant rack to a different location. For example, if sensor data or context data indicates a temperature decrease (possibility of frost), the instructions may indicate the robotic rack-driver device 206 should move the plant rack 204 inside a protected/sheltered/heated area or be placed below a plastic cover/roof or other protection from the weather.

In other examples, the robotic rack-driver device 206 receives the instructions 236 from a remote computing device, such as a user device 234. The user device is a computing device for generating a set of maintenance instructions 130, such as, but not limited to, the computing device 102 in FIG. 1. A user may utilize the user device to manually trigger watering of a cart/initiate watering by the sprinkler device if the sprinkler fails to begin watering automatically. In other examples, the user device may be utilized by the user to manually trigger a robotic rack-driver device to attach to a selected plant rack for watering. In other words, a user may manually enter a rack ID and prompt the robotic rack-driver device to move the selected rack to the watering zone for watering at a time when watering is not scheduled (unscheduled date/time) or otherwise outside of the scheduled watering schedule for the selected rack or in addition to scheduled watering times.

The robotic rack-driver device 206 moves the plant rack 204 from an assigned location where the plant rack 204 is currently located to a watering zone associated with a frame-mounted sprinkler device 238 at the next scheduled watering time provided in the instructions 236. The robotic rack-driver device 206 may utilize a set of navigation instructions to guide the robotic rack-driver device 206 from the assigned location to the location of the frame-mounted sprinkler device 238.

The frame-mounted sprinkler device 238 includes one or more sprinkler heads mounted to a frame. The frame may be an A-frame, arch shaped, rectangular shaped, or any other shape. In this example, the frame-mounted sprinkler device 238 includes a set of water pipes or water lines within a set of hollow pipes forming the frame. The set of water pipes/lines carry water from a water supply 240 to the sprinkler head(s) for release onto the plant rack 204.

The frame-mounted sprinkler device 238 optionally includes a set of one or more sensor devices 242. A sensor device in the set of sensor devices 242 may include a barcode reader, image capture device (camera), motion sensor, pressure sensor, weight sensor, heat sensor, temperature sensor, hygrometer, proximity sensor, light sensor, or any other type of sensor device.

The frame-mounted sprinkler device 238 in this example transmits the sensor data generated by the set of sensor devices 242 to the user device 234 and/or the robotic rack-driver device 206. In other examples, the frame-mounted sprinkler device 238 optionally analyze sensor data generated by the set of sensor devices 242 to detect the presence of the plant rack 204 within the watering zone of the frame-mounted sprinkler device 238. When the frame-mounted sprinkler device 238 detects the plant rack 204 in the watering zone, the frame-mounted sprinkler device 238 automatically begins spraying water onto the plant(s) on the plant rack, the set of water absorbent mats and/or the pots/containers holding the plants. In other examples, the frame-mounted sprinkler device 238 does not begin spraying water until the frame-mounted sprinkler device 238 receives a signal/instruction from another device, such as, but not limited to, the robotic rack-driver device 206, the plant rack 204 or the user device 234.

The watering zone is an area associated with the frame-mounted sprinkler device 238 which receives water from the frame-mounted sprinkler device 238. In other words, items within the watering zone are within range of the sprinkler(s) on the frame-mounted sprinkler device 238. Items outside the watering zone do not receive any water (out of range) of the frame-mounted sprinkler device 238.

The live plant center 200 in at least some examples includes a set of drains 244 for collecting/reclaiming water run-off from the plant rack 204 during watering. The set of drains may be located in the floor or in a bottom portion of the sprinkler device or any other device for capturing water run-off from the plant racks.

The reclaimed water 248 is collected in a water receptacle. The water receptacle 246 may include one or more water storage containers or reservoirs for holding water. The water receptacle may include one or more sensor devices for measuring/determining quality of the reclaimed water, identify any impurities or additives in the water, temperature of the water, etc. For example, if fertilizer is added to the water, the sensor device detects the concentration of the fertilizer in parts per million (PPM). The sensor may also be utilized to identify hard water, water which is too hot or too cold for use on the plants, etc.

The reclaimed water 248 acts as an additional water supply for the frame-mounted sprinkler device 238. The frame-mounted sprinkler device 238 re-uses the reclaimed water to water plants on the plant rack 204 and/or other plant racks.

In at least some examples, the water may be filtered through a set of filters 250 to remove particulate matter 252 or other impurities/additives from the reclaimed water 248 prior to storage or prior to use. In other examples, the frame-mounted sprinkler device 238 may include one or more filters to filter the reclaimed water 248 prior to spraying the reclaimed water on other plants. In these examples, the set of sensor devices 242 may also include water quality sensors for detecting impurities, additives, particulate matter and other contents of the water supply 240 prior to spraying on the plant rack(s). If the sensor data indicates the water is too acidic or otherwise contains undesirable additives, an instruction may be generated instructing a user to add a neutralizer to the water supply 240 to counteract the effects of the undesired elements.

The water reclamation system in this example reclaims water run-off from the plant racks during watering. In other examples, the water reclamation system catches rain water and/or utilizes rainwater captured in rain barrels or other water receptacles.

In still other examples, the system may output instructions to the user device instructing a user to manually remove one or more plants from a selected plant rack. For example, if the system determines that one or more plants on a given rack are yellowing, dying, or otherwise should be removed from the rack, the system may output a notice to a user device instructing a user to remove those plants. The notice may include a plant ID identifying the plants to be relocated to a clearance area, donation area or other disposal area.

In yet other examples, the system outputs instructions to a drone or other autonomous robot instructing the drone to remove one or more plants from a given plant rack if the system identifies those plants have having poor quality, out-of-season, ready for markdown/clearance, or otherwise designated for removal from the cart.

The system may also output a notification to a user device or other autonomous robot/drone to remove one or more plants which have been incorrectly placed onto a selected plant rack. For example, if a plant rack contains all bushes, and a user mistakenly misplaces an annual flowering plant on the plant rack, that succulent plant would be subjected to non-optimal watering schedules suited to bushes rather than annual flowers. The notice may include a rack ID identifying the plant rack and a plant ID identifying the annual plant to be removed from the plant rack and returned to its correct location elsewhere in the plant center.

The system may also output notifications to a user device and/or other autonomous robot/drone to relocate/reposition items on a cart to improve overall appearance/display value of the item. For example, if plants are arranged so that all red flowering plants are grouped together, and white flowering plants are grouped together on another rack, the system outputs a notification requesting removal/relocation of any white flowering plants mistakenly mixed in with the red flowering plants to improve appearance of the plants and display value of the displays, as well as ease of locating desired items.

Figure 3:
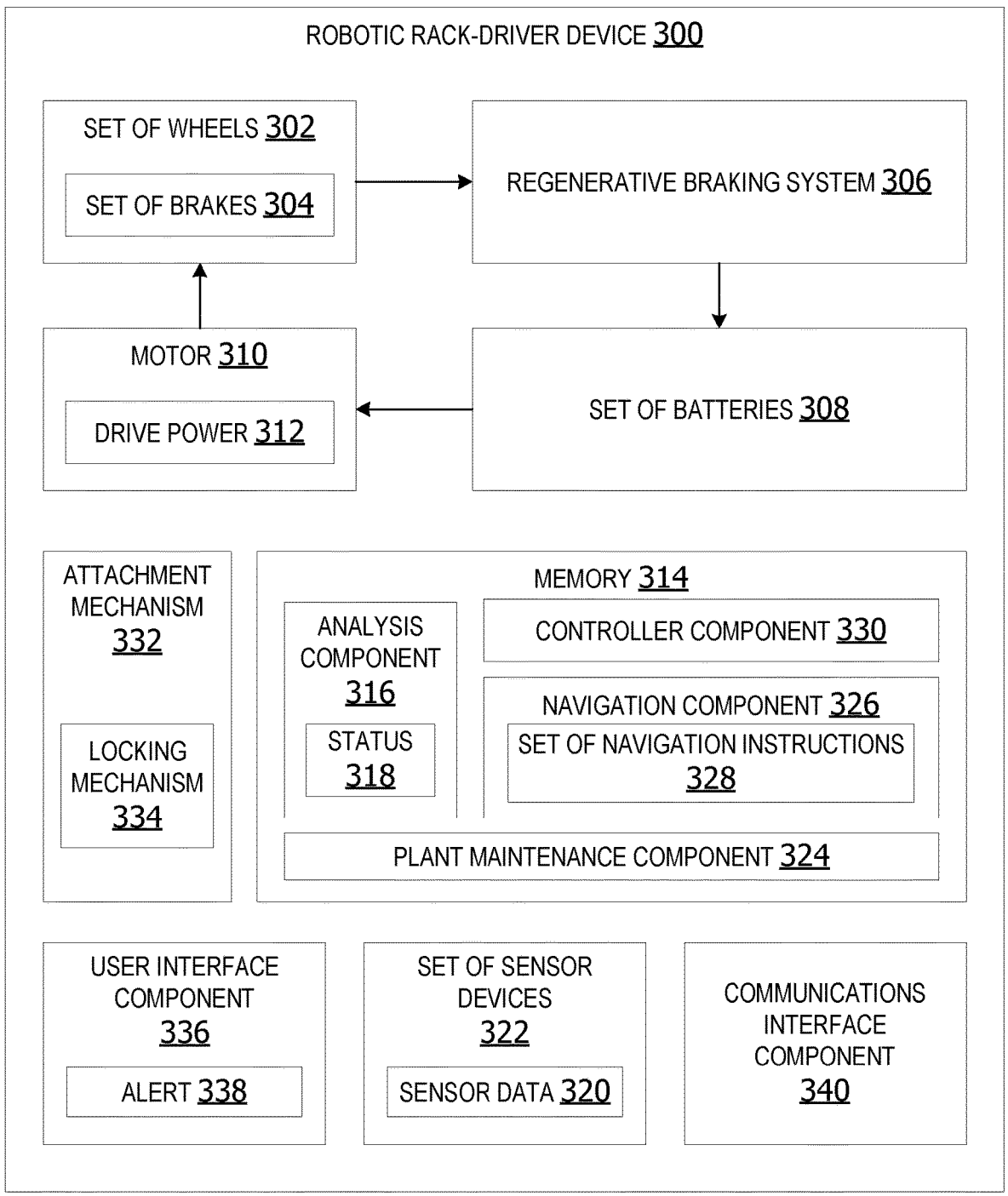
FIG. 3 is an exemplary block diagram illustrating a robotic rack-driver device.

FIG. 3 is an exemplary block diagram illustrating a robotic rack-driver device 300. The robotic rack-driver device 300 includes a set of one or more wheels 302 having a set of one or more brakes 304. When a brake is applied to one of the wheels, a regenerative braking system 306 converts kinetic energy into power to recharge one or more batteries in a set of batteries 308. The set of batteries 308 may be utilized to power a motor 310. The motor may be implemented as an electric motor or any other type of motor generating drive power 312 to turn one or more of the wheels.

In at least some example, a memory 314 includes an analysis component 316 implemented by at least one processor on the robotic rack-driver device 300. The analysis component analyzes sensor data 320 generated by a set of sensor devices 322 associated with at least a portion of a live plant center with real-time context data associated with a plurality of maneuverable plant racks using a set of plant maintenance rules. The analysis component 316 generates a status 318 of one or more plants on one or more plant racks based on a result of the analysis. A plant maintenance component identifies 324 utilizes the status 318 to identify a selected plant rack for watering next.

A navigation component 326 generates a set of navigation instructions 328 for moving the selected plant rack to a watering zone and/or move the selected plant rack through a set of rotational motions within the watering zone during watering. The navigation component 326 optionally also generates instructions to return the selected plant rack to the assigned location of the selected plant rack when watering of plants on the plant rack is completed. For example, if the plant rack is positioned near an entry way, when watering is complete, the robotic rack-driver device returns the plant rack to the same location near the entry way.

In other example, the robotic rack-driver device 300 may move the plant rack to a different location after watering. For example, if the plants on the plant rack will soon be out-of-season or the sensor data indicates the plants on the plant rack are slightly yellowing/wilted, the plant rack is moved to a clearance area.

A controller component 330 on the robotic rack-driver device 300 in other examples triggers activation of an attachment mechanism 332 to attach to an attachment point on a selected plant rack. When attachment is complete, the controller component 330 activates a locking mechanism 334 to secure the plant rack to the robotic rack-driver device. When watering of plants on the plant rack is complete and the plant rack is returned to the plant rack's assigned location, the controller component 330 triggers release of the locking mechanism 334. When released/unlocked, the selected plant rack is detached from the robotic rack-driver device at the assigned location.

The robotic rack-driver device optionally includes a user interface component for outputting data to a user and/or receiving data from a user. For example, the user interface device may output an alert 338 if the robotic rack-driver device is malfunctioning or requires maintenance.

The robotic rack-driver device 300 in this example includes a communications interface component 340. The communications interface component 340 enables the robotic rack-driver device to send and receive data via a network, such as, but not limited to, the network 112 in FIG. 1.

Figure 10:
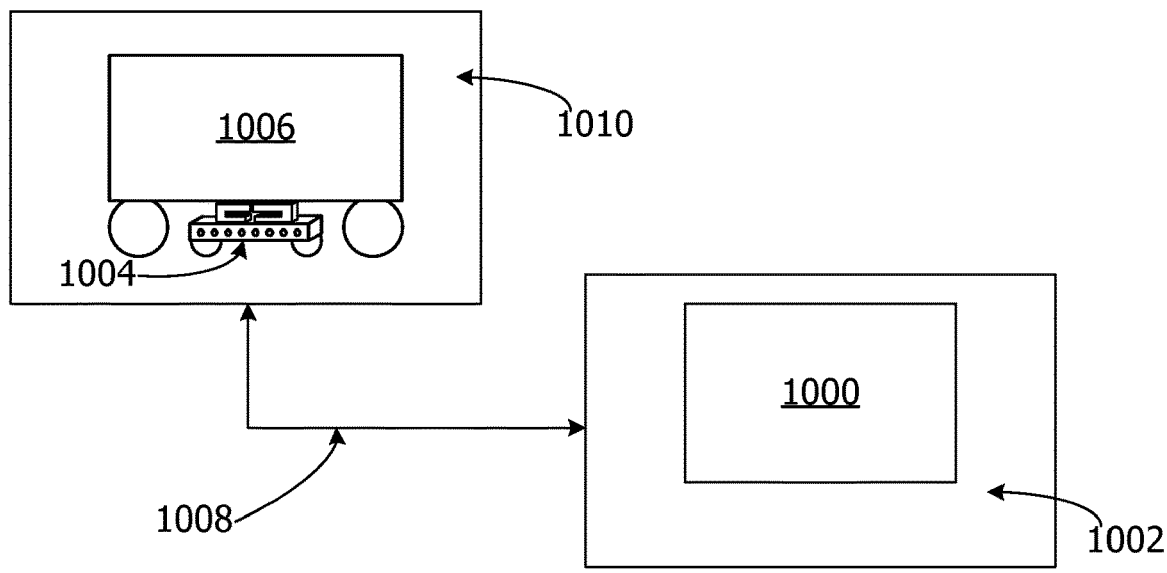
FIG. 10 is an exemplary block diagram illustrating a watering zone associated with a frame-mounted sprinkler device.

In this example, the robotic rack-driver device 300 attaches to an underside of a plant rack. In other examples, the robotic rack-driver device 300 attaches to a side portion or front portion of a bottom member of a plant rack. In other words, the robotic rack-driver device 300 is positioned in front of the rack and pulls the plant rack rather than being positioned underneath the plant rack, as shown in FIG. 10 below.

In still other examples, the robotic rack-driver device 300 attaches to a side or back portion of the bottom member of the plant rack and pushes the plant rack. In these examples, the robotic rack-driver device 300 is positioned behind the plant rack rather than beneath or in front of the plant rack.

The robotic rack-driver device 300 in another example includes an on-board data storage device for storing sensor data, watering schedules, status data, historical data, barcode data, or any other data utilized by the robotic rack-driver device 300 for maintaining plants on one or more plant racks.

Figure 4:
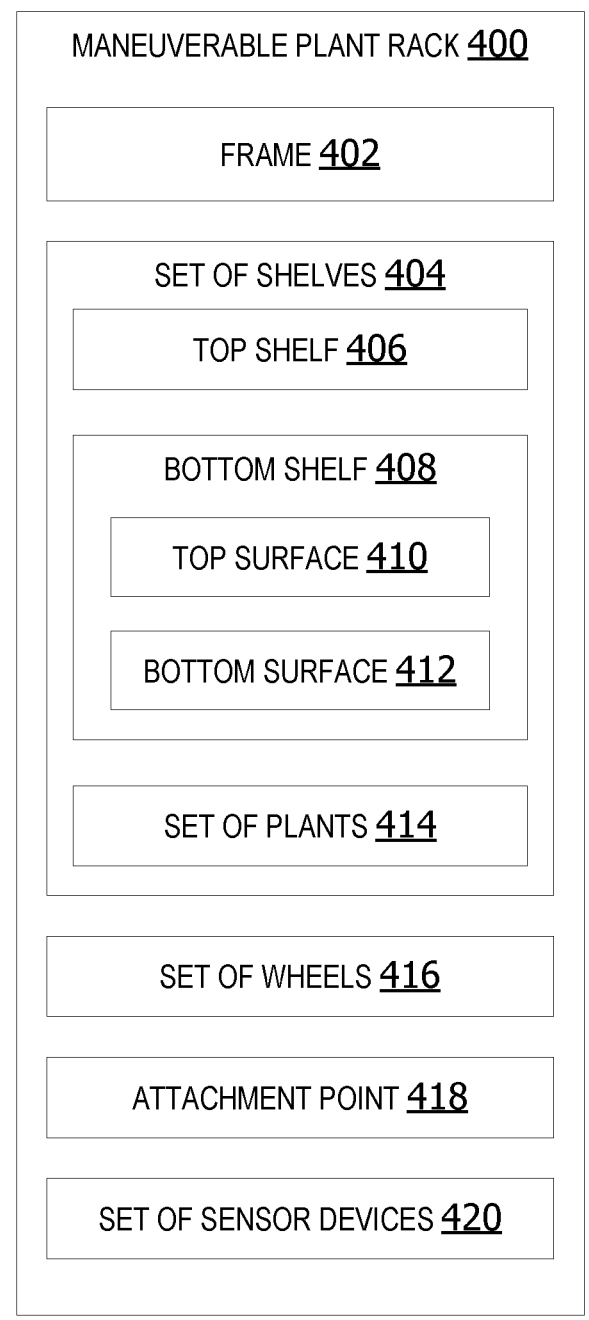
FIG. 4 is an exemplary block diagram illustrating a maneuverable plant rack.

FIG. 4 is an exemplary block diagram illustrating a maneuverable plant rack 400. The maneuverable plant rack 400 includes a frame 402 including a set of one or more shelves. The set of shelves in this non-limiting example includes a top shelf 406 and a bottom shelf 408. In other examples, the set of shelves may include a single shelf, as well as three or more shelves.

The bottom shelf 408 may include a top surface 410 and a bottom surface 412. An absorbent mat may be placed on the top surface 410. One or more plants may be placed on top of the absorbent mat.

A set of wheels 416 and an attachment point 418 for a robotic rack-driver device to connect are attached to the bottom surface 412 of the bottom shelf 408. The bottom shelf may also be referred to as the lowest shelf or a bottom member of the rack. The maneuverable plant rack 400 may optionally include a set of one or more sensor devices 420 for generating sensor data associated with plant(s) on the maneuverable plant rack 400 and/or conditions surrounding the maneuverable plant rack 400.

Figure 5:
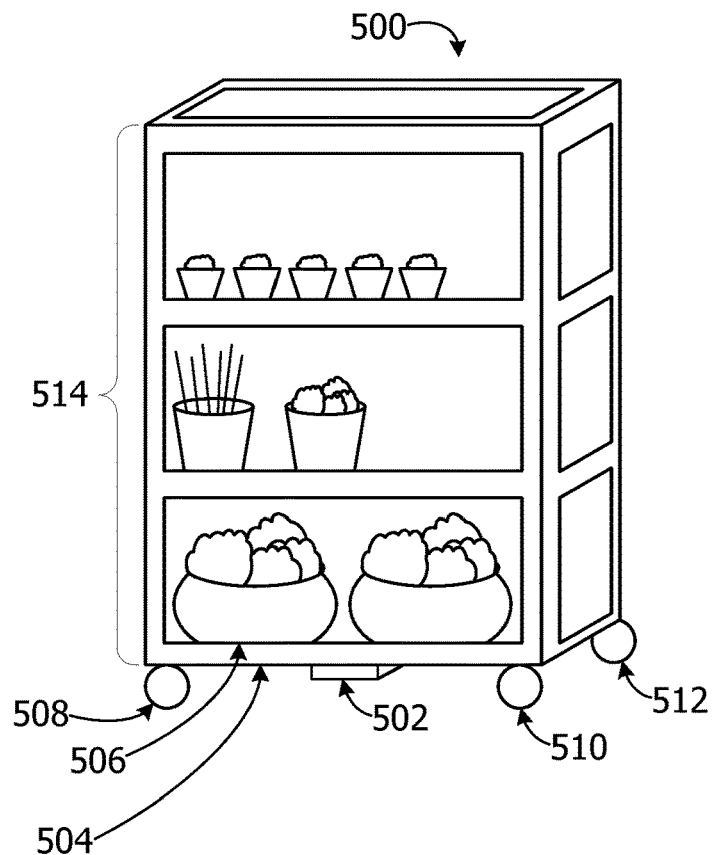
FIG. 5 is an exemplary block diagram illustrating a maneuverable plant rack having an attachment point.

FIG. 5 is an exemplary block diagram illustrating a maneuverable plant rack 500 having an attachment point 502 on an underside 504 of a shelf member 506. The attachment point 502 in this example is provided between two or more wheels, such as, but not limited to, wheel 508, 510 and/or 512. In this example, three wheels are shown. However, the maneuverable plant rack is not limited to three wheels. The maneuverable plant rack 400 may include a single wheel, as well as two or more wheels.

The maneuverable plant rack 500 includes a set of shelves 514 for displaying one or more live plants. In this example, the set of shelves 514 includes four shelves. In other examples, the maneuverable plant rack 500 may include a single shelf, two shelves, as well as three or more shelves.

The plant rack in this example contains small potted plants. In other examples, however, a plant rack may hold larger items such as fruit trees, shade trees, or other larger plant types.

Figure 6:
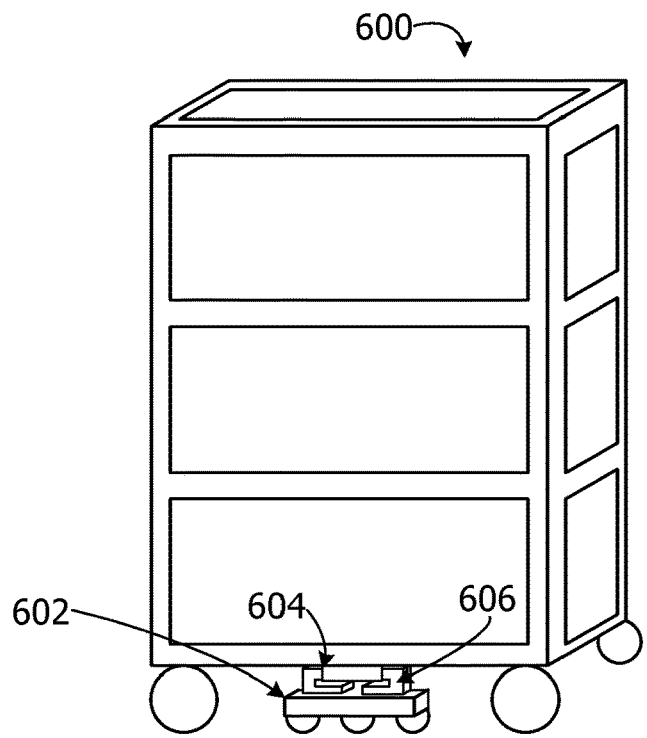
FIG. 6 is an exemplary block diagram illustrating a maneuverable plant rack connected to a robotic rack-driver device.

FIG. 6 is an exemplary block diagram illustrating a maneuverable plant rack 600 connected to a robotic rack-driver device 602. An attachment mechanism 606 on the robotic rack-driver device 602 connects to an attachment point 604 on the plant rack 600.

Figure 7:
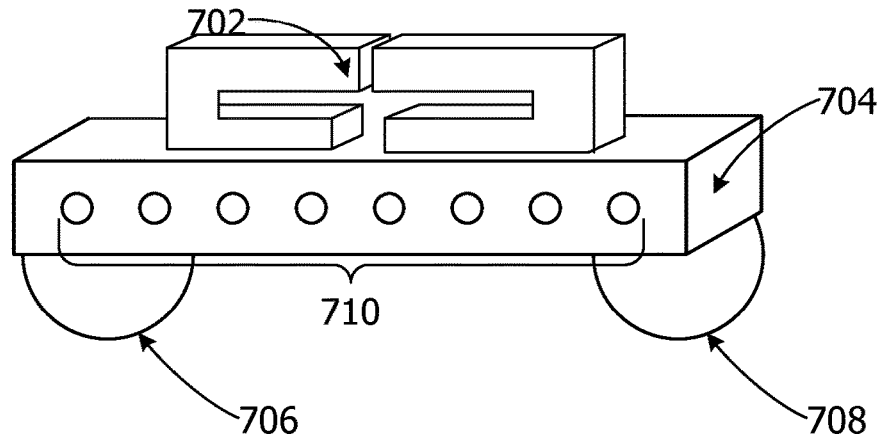
FIG. 7 is an exemplary block diagram illustrating a robotic rack-driver device detached from a maneuverable plant rack.

FIG. 7 is an exemplary block diagram illustrating a robotic rack-driver device 700 detached from a maneuverable plant rack. The robotic rack-driver device 700 includes an attachment mechanism 702 on a top portion of a main body 704 of the robotic rack-driver device 700 for grasping/attaching to a portion of a plant rack.

The attachment mechanism 702 shown in this example is a clamp that attaches to a portion of the rack. In other examples, the attachment mechanism may include a coupling device, a universal joint, a suction device, a hook and loop connector, or any other type of device for connecting the robotic rack-driver device to a portion of the plant rack.

The robotic rack-driver device 700 includes a set of one or more wheels, such as, but not limited to, wheel 706 and 708. The robotic rack-driver device 700 optionally includes a set of one or more sensor devices 710 for gathering data associated with an environment around the robotic rack-driver device 700.

Figure 8:
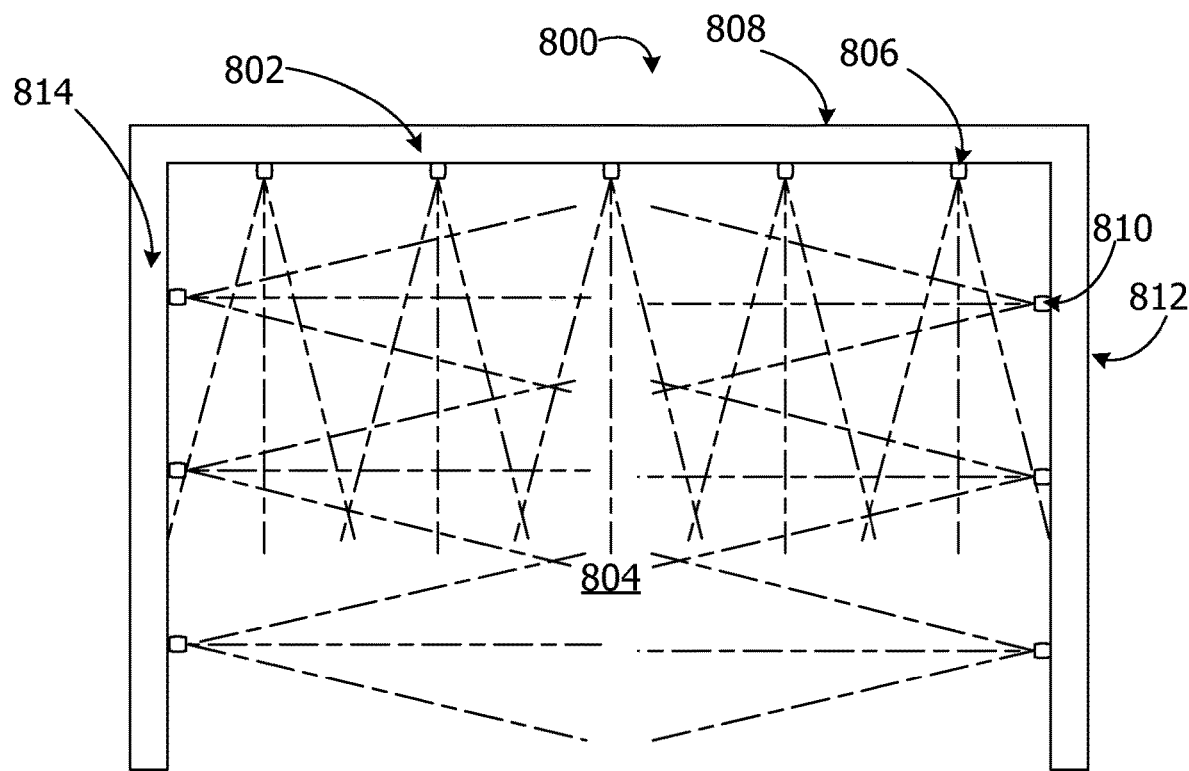
FIG. 8 is an exemplary block diagram illustrating a frame-mounted sprinkler device.

FIG. 8 is an exemplary block diagram illustrating a frame-mounted sprinkler device 800. A frame 802 includes one or more sprinkler heads spraying water into a watering zone 804, such as, but not limited to, the sprinkler head 806 attached to the top member 808 and/or the sprinkler head 810 attached to the side member 812.

In this example, the frame 802 includes a top member, a first side member 814 and a second side member 812. The frame 802 further includes eleven sprinkler heads in total, with three sprinkler heads on the first side member 814, three sprinkler heads on the second side member 812 and five sprinkler heads along the top member 808 of the frame. However, in other examples, the frame may include a single sprayer head, as well as two or more sprinkler heads arranged on the frame 802. The sprinkler heads may be integrated/embedded within the frame or attached to an aperture or other connection point on the frame.

Figure 9:
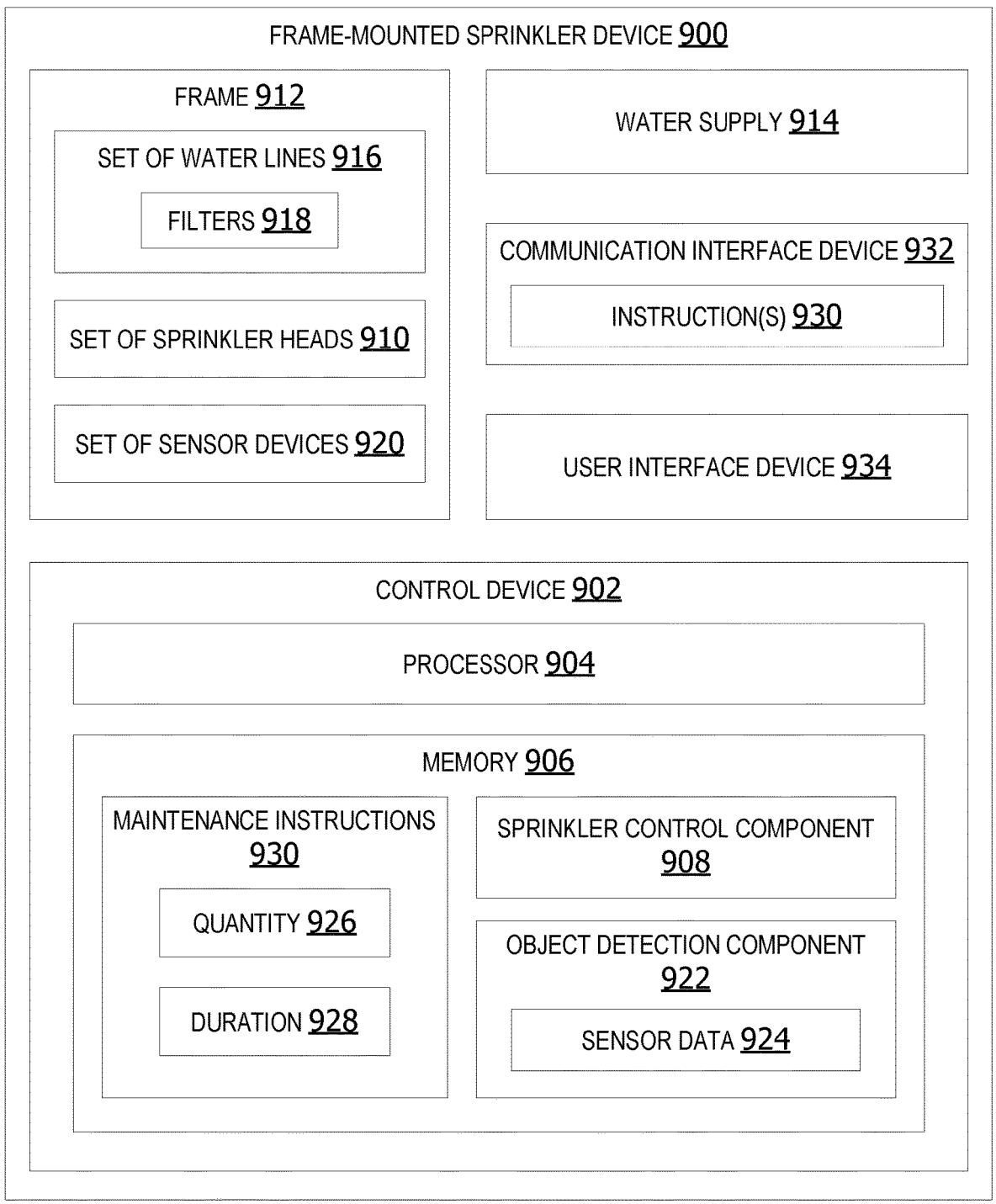
FIG. 9 is an exemplary block diagram illustrating a frame-mounted sprinkler device including a control device.

FIG. 9 is an exemplary block diagram illustrating a frame-mounted sprinkler device 900 including a control device 902. In this example, the control device 902 includes a processor 904 communicatively coupled to a memory 906. A sprinkler control component 908 controls activation of a set of one or more sprinkler heads 910 embedded within a frame 912 of the frame-mounted sprinkler device 900. The set of sprinkler heads sprays/releases water from a water supply 914 into a watering zone. Each sprinkler head is connected to the water supply 914 via a set of water lines 916 running through a hollow center of the frame 912. The set of water lines 916 optionally include a set of one or more filters 918 to remove additives, particulates and other undesirable elements from the water prior to spraying on the plant rack.

The frame 912 may optionally include a set of one or more sensor devices 920 for generating sensor data describing ambient conditions surrounding the frame-mounted sprinkler device, such as temperature, humidity, etc. The set of sensor devices 920 in other examples include sensor for detecting impurities in the water running through the set of water lines 916.

In still other examples, the set of sensor devices 920 includes one or more cameras, pressure sensors, scanner devices, weight sensors or other sensor devices for detecting a presence of a plant rack within the watering zone. An object detection component 922 in these examples analyzes the sensor data 924 generated by the set of sensor devices 920 to detect a plant rack entering the watering zone and/or detect a plant rack leaving/exiting the watering zone. In these examples, the sprinkler control component 908 automatically initiates/turns on the sprinkler device to begin watering when a plant rack is detected within the watering zone. Likewise, the sprinkler control component 908 ceases watering/stops release of water from the sprinkler head(s) when the quantity 926 of water specified in the maintenance instructions 930 have been released onto the plant rack.

In other examples, when the object detection component 922 identifies a plant rack in the watering zone, the sprinkler control component turns on the set of sprinkler heads to release water into the watering zone for a duration 928 of time specified in the maintenance instructions 930 for the identified plant rack in the watering zone.

The frame-mounted sprinkler device 900 may optionally include a communications interface device 932 enabling the device to send and receive data from other devices, such as, but not limited to, one or more robotic rack-driver device and/or one or more plant racks. The frame-mounted sprinkler device 900 may also include a user interface device 934. The user interface device 934 enables a user to provide/input data and/or receive output data from the frame-mounted sprinkler device. In some examples, if the sprinkler device is experiencing technical difficulties/mechanical failure or requires maintenance, the user interface device 934 outputs an alert. The alert/notification may be output via a light, a speaker, a display screen, or any other type of output.

FIG. 10 is an exemplary block diagram illustrating a watering zone 1000 associated with a frame-mounted sprinkler device 1002. In this example, a robotic rack-driver device 1004 moves a plant rack 1006 along a route 1008 away from an assigned location 1010 of the plant rack to the watering zone. The robotic rack-driver device in this non-limiting example latches onto a front or side portion of the rack and pulls the rack along a path to the watering zone. In other examples, the robotic rack-driver device attaches to an underside of the rack and is positioned underneath the rack instead of in front of the rack as shown in FIG. 10. In still other examples, the robotic rack-driver device may push the rack in a desired direction.

When the plant rack 1006 is detected within the watering zone, the frame-mounted sprinkler device 1002 begins watering. When watering is completed, the robotic rack-driver device 1004 returns the plant rack 1006 back to the assigned location 1010 of the plant rack.

In this example, a single robotic rack-driver device pulls the plant rack to the watering zone and then returns the rack to a desired display location or clearance area. In other examples, if the rack is very large or heavy, two robotic rack-driver devices may work together to pull or push the rack. In other words, the rack may include multiple attachment points at which two or more robotic rack-driver devices may attach to the rack to pull and/or push the rack in a desired direction.

In the example above, one robotic rack-driver device may attach to a front portion of the rack and pull the rack while another robotic rack-driver device attaches to a back portion of the rack and pushes the rack. In still another example, two robotic rack-driver devices may attach to an underside of the rack to drive the rack together. In yet another example, two robotic rack-driver devices may attach to a front portion of the bottom member side-by-side and pull the rack together to the watering zone. In another example, one robotic rack-driver device attaches to one side of the rack and another robotic rack-driver device attaches to another side of the rack. The two robotic rack-driver devices guide/drive the rack together towards the watering zone.

In examples in which two or more robotic rack-driver devices drive a rack, the two robotic rack-driver devices communicate with each other via the network to coordinate/match their speeds and direction. In this manner, the two robotic rack-driver devices ensure they are coordinating their efforts and following the same path/navigational instructions. This enables the robotic rack-driver devices to pull larger carts/racks or rolling trays holding one or more heavy/bulky items, such as fruit trees or other heavy items.

Figure 11:
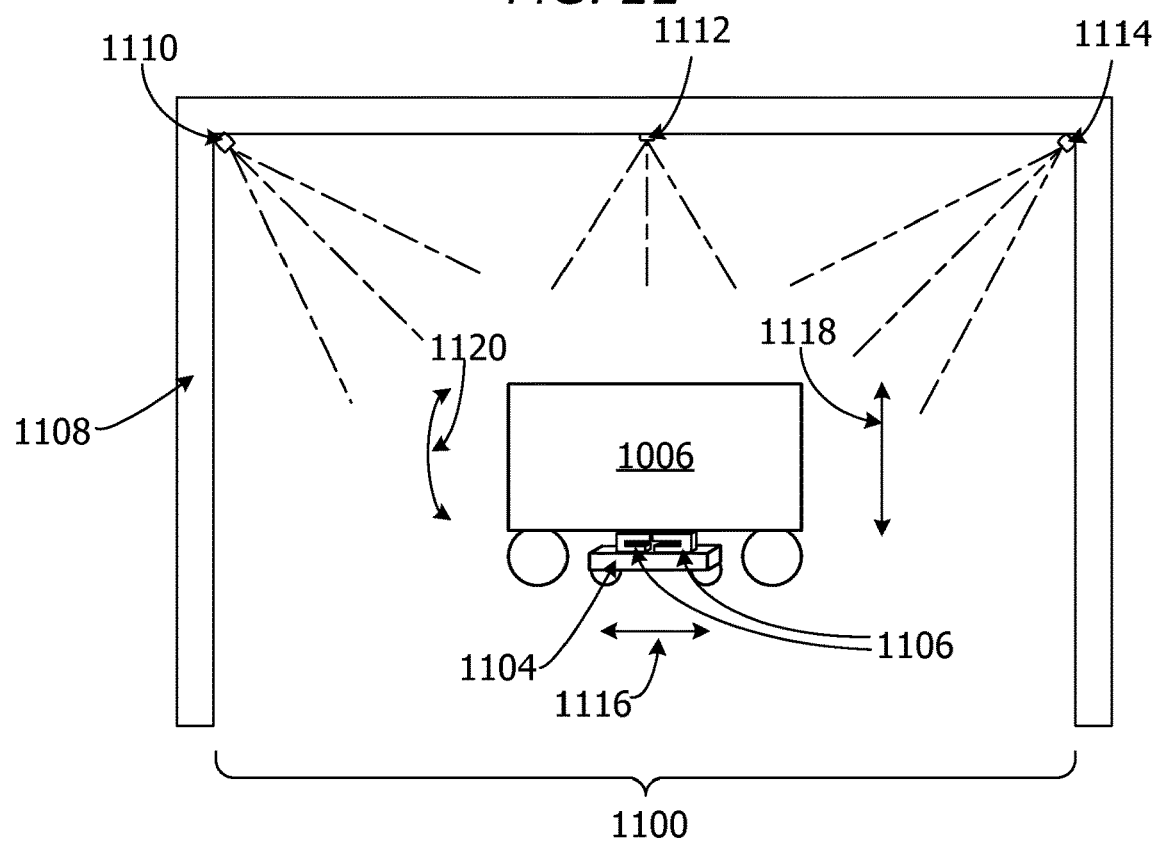
FIG. 11 is an exemplary block diagram illustrating a robotic rack-driver device moving a plant rack inside a watering zone associated with a frame-mounted sprinkler device.

FIG. 11 is an exemplary block diagram illustrating a robotic rack-driver device 1104 moving a plant rack 1102 inside a watering zone 1100 associated with a frame-mounted sprinkler device 1108. The frame-mounted sprinkler device 1108 includes a set of sprinklers spraying water onto the plant rack 1102 within the watering zone 1100. In this non-limiting example, the set of sprinklers includes sprinkler 1110, sprinkler 1112 and sprinkler 1114. The examples are not limited to three sprinkler heads. In other examples, the frame-mounted sprinkler device 1108 may include a single sprinkler device, as well as two or more sprinklers.

In this example, the robotic rack-driver device 1104 attaches to the plant rack via an attachment mechanism. In this example, the attachment mechanism 1106 attaches to the plant rack 1102 via two connection points. In other examples, the attachment mechanism may attach to the plant rack via a single attachment point, as well as three or more attachment points.

The robotic rack-driver device 1104 maneuvers the plant rack 1102 within the watering zone in accordance with a set of navigational instructions specifying a set of motions/revolutions. The robotic rack-driver device 1104 moves the plant rack side-to-side 1116, forward or backward 1118 and/or in a circular rotation along a three-hundred and sixty-degree axis to ensure equal distribution of water onto all plants on the plant rack.

Rotating the plant rack may during watering includes turning the plant rack or otherwise moving the plant rack within the watering zone during water. Rotating the rack includes turning the rack in a circle, turning the rack in a semi-circle, moving the rack from side-to-side, moving the rack forward and/or moving the rack backward. Turning in a circle or a semi-circle includes turning the rack by forty-five degrees, turning the rack by ninety degrees, turning the rack by one-hundred eighty degrees, turning the rack by three-hundred and sixty degrees or any other degree of rotation.

Figure 12:
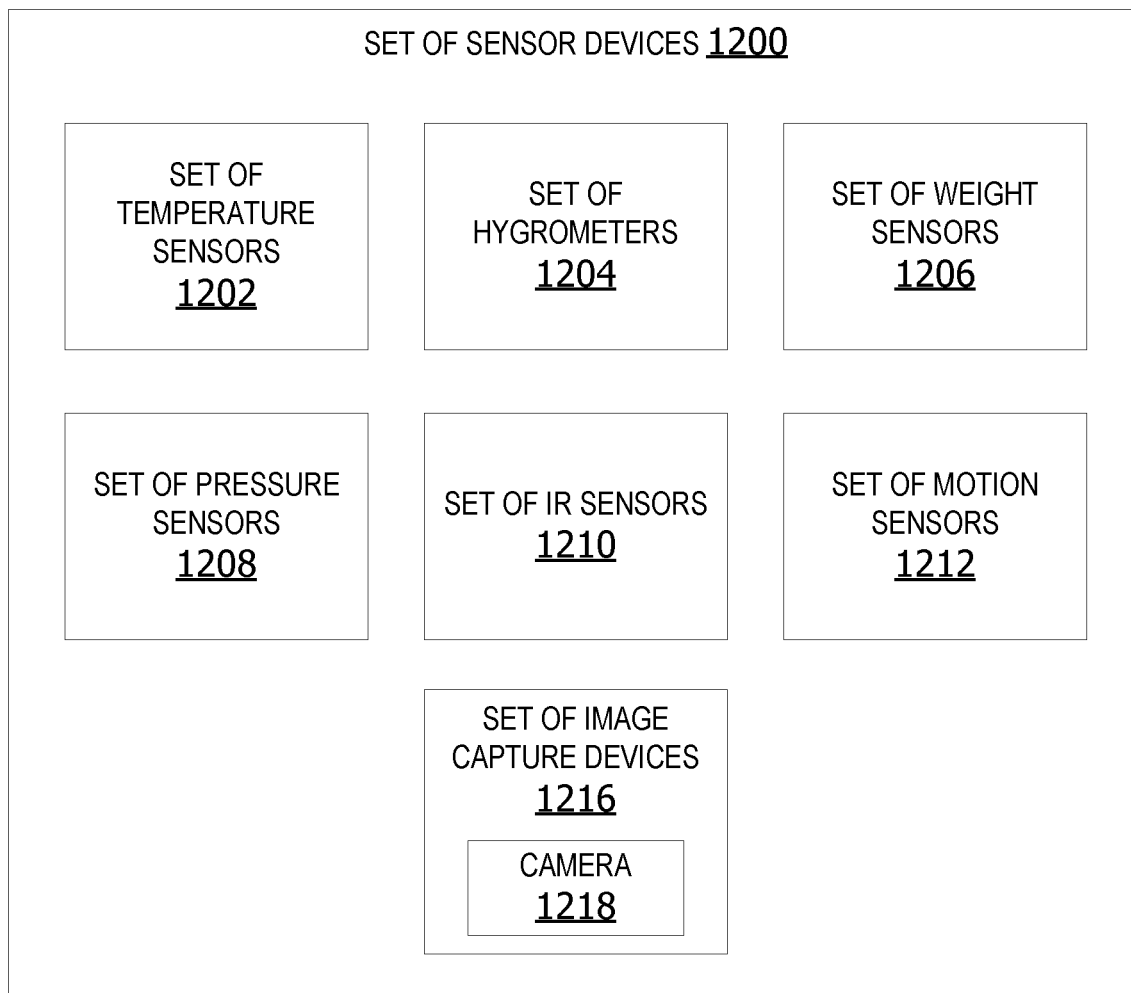
FIG. 12 is an exemplary block diagram illustrating a set of sensor devices.

FIG. 12 is an exemplary block diagram illustrating a set of sensor devices 1200. The set of sensor devices 1200 in some example includes sensor devices on a robotic rack-driver device. In other examples, set of sensor devices 1200 includes sensor devices on a plant rack. In still other examples, the set of sensor devices 1200 are located on a frame-mounted sprinkler device. The set of sensor devices 1200 in other examples may include sensor devices within a live plant center.

The set of sensor devices 1200 in this example includes a set of one or more temperature sensors 1202 such as a thermometer, a set of one or more hygrometers 1204 for measuring humidity, a set of one or more weight sensors

1206, a set of one or more pressure sensors 1208, a set of one or more infrared (IR) sensors 1210, a set of one or more motion sensors 1212, a set of one or more scanner devices 1214, and/or a set of one or more image capture devices 1216, such as, but not limited to, a camera 1218. The set of scanner devices 1214 may include a barcode scanner, a QR code reader, an RFID tag reader, or any other type of scanner. A barcode scanner may include a UPC code reader, a matrix barcode reader, etc.

Figure 13:
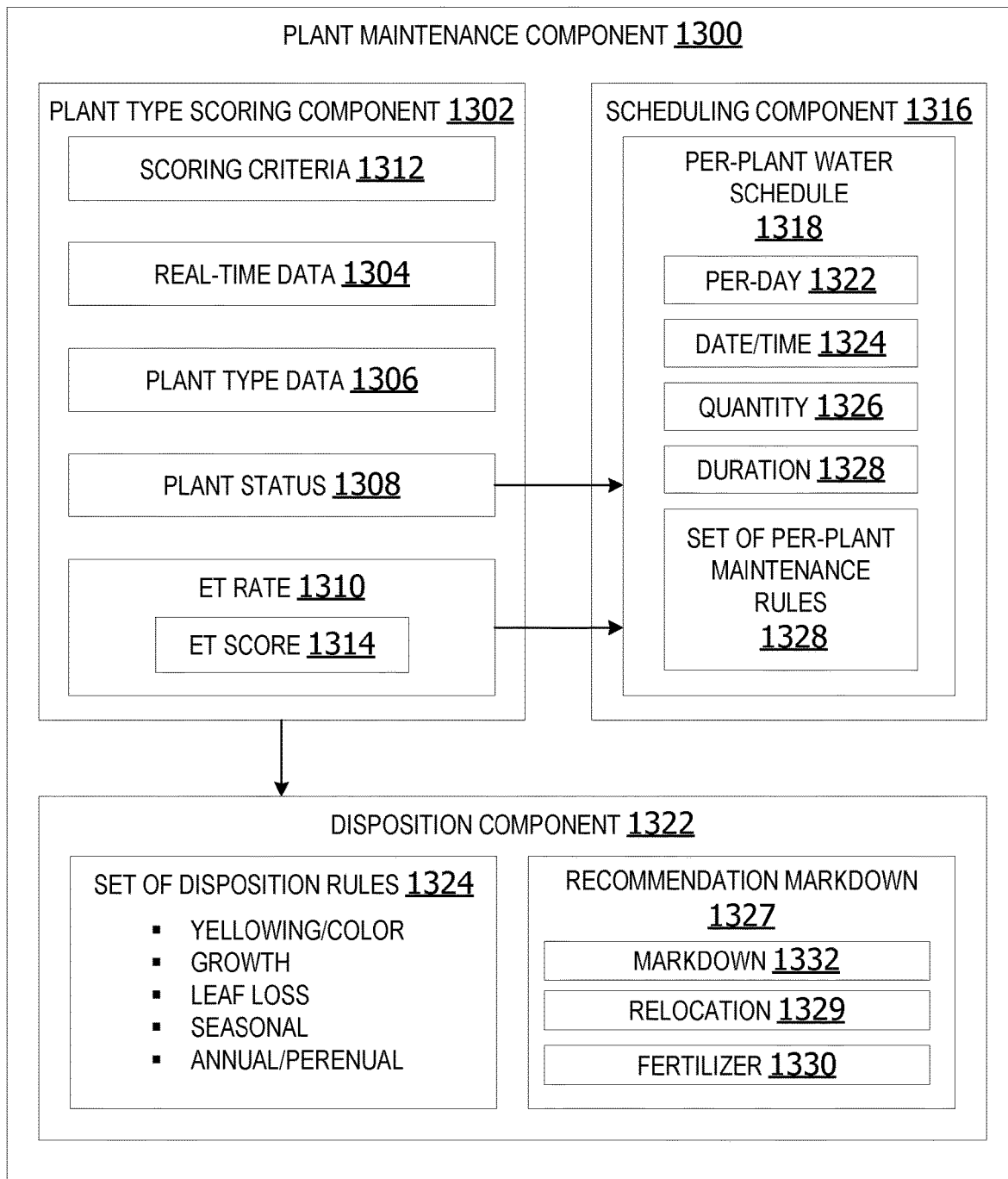
FIG. 13 is an exemplary block diagram illustrating a plant maintenance component.

FIG. 13 is an exemplary block diagram illustrating a plant maintenance component 1300. A plant type scoring component 1302 analyzes real-time data 1304 with plant type data 1306 and/or plant status data 1308 to generate an evapotranspiration (ET) rate for a given plant or a given plant type. The plant type data 1306 is data associated with a type of plant. For example, if the plant type is a rose bush, the plant type data 1306 includes data associated with rose bushes, such as, but without limitation, number of hours of sun per day, water saturation/moisture levels, etc.

The plant type scoring component 1302 generates an ET score 1314 for the selected plant and/or the plant type associated with the selected plant based on the ET rate 1310 and a set of scoring criteria 1312. The scoring criteria includes rules for scoring each plant type based on the ET rate.

A scheduling component 1316 generates a per-plant water schedule 1318 for a selected plant or the selected plant type based on the ET score 1314 and a set of per-plant maintenance rules 1320 for that type of plant. The per-plant water schedule is customized based on weather conditions, ambient temperature and humidity in the plant center, the plant type data, etc. The per-plant water schedule 1318 may include how many times to water the plant per-day (daily frequency of watering), a date and/or time for the next schedule watering, a quantity 1326 of water to be applied to the selected plant or to plants of the same selected plant type, and/or duration 1328 for watering. The duration 1328 refers to length of time to spray water on the plant rack when the plant rack is within the watering zone.

A disposition component 1322 generates a recommendation 1327 for disposing of a plant based on the plant's condition based on a set of disposition rules 1324. The recommendation 1327 may include a recommendation to markdown 1332 one or more plants or plant types (reduce price). A markdown may occur when a plant type is out-of-season or almost out-of-season.

A recommendation of relocation 1329 of one or more plants, types of plants or plant rack(s) may be made when a rack of plants or one or more plants on the rack should be moved to a different location. For example, a plant may be moved to a location with better light, more shade or for better coordination with other plants/plant colors. Plants or racks of plants may also be moved to a markdown/clearance area.

A recommendation may also include a recommendation to add fertilizer 1330 or other additives to the plant or water sprayed on the plant. A recommendation may be made based on a condition of a plant, such as yellowing, change in color, new growth, lack of new growth, wilting, leaf loss, etc. The recommendation may also be made based on weather and season and whether the plant is an annual or perennial.

Figure 14:
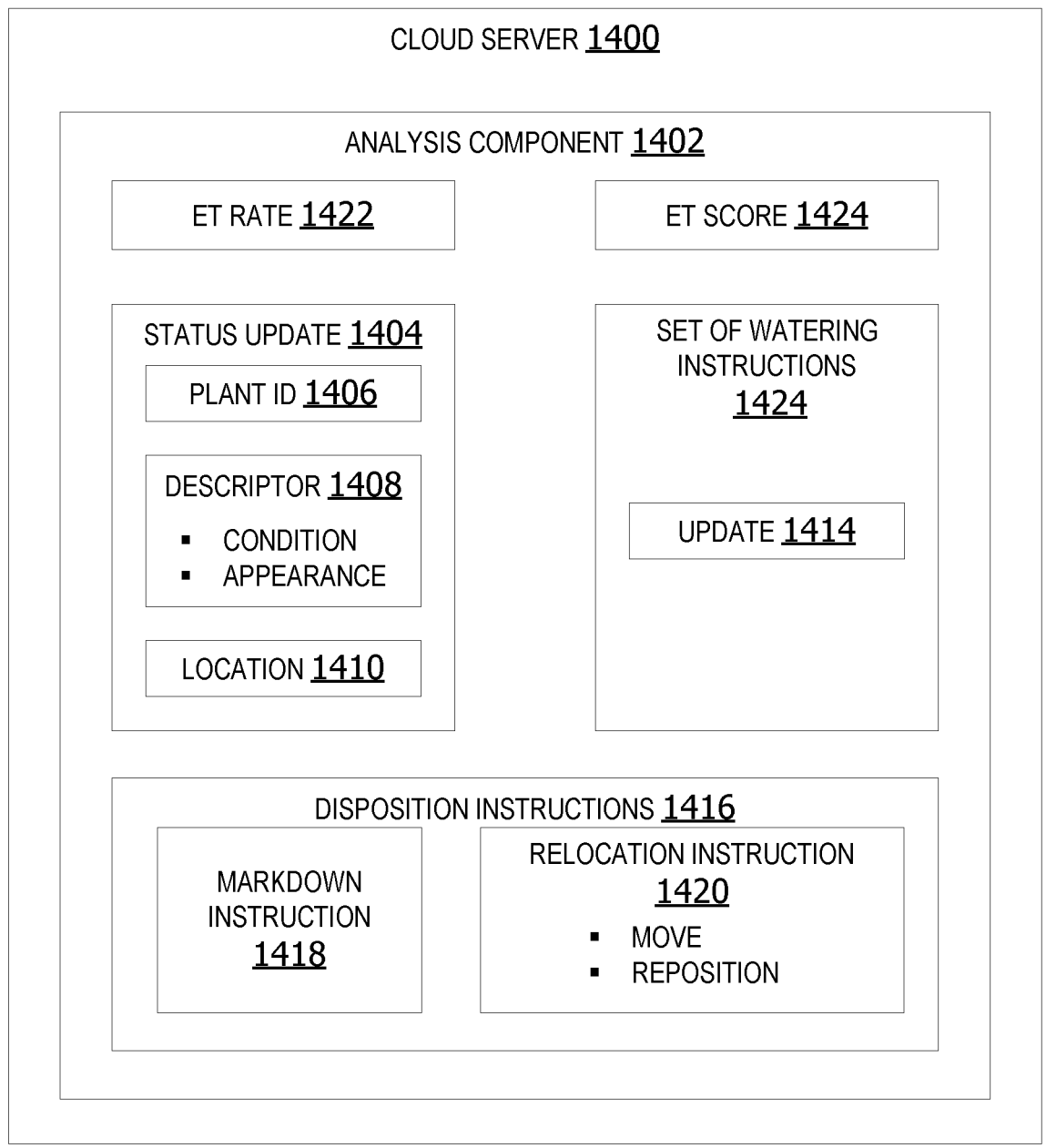
FIG. 14 is an exemplary block diagram illustrating a cloud server including an analysis component.

FIG. 14 is an exemplary block diagram illustrating a cloud server 1400. The cloud server 1400 in this example implements an analysis component 1402. The analysis component includes an artificial intelligence (AI) with machine learning (ML) permitting the system to analyze real-time data using historical data and training data using pattern analysis to improve watering schedules and plant maintenance/plant quality.

The analysis component performs analytics in this example remotely from the robotic rack-driver device to reduce resource usage on the robotic rack-driver device. The cloud server maintains network connectivity with devices such as the robotic rack-driver device, sprinkler device and/or plant racks via the network.

In this example, the analysis component 1402 generates a status update 1404 for a plant based on results of analysis of sensor data and context data. The status update 1404 may include a plant ID 1406, a descriptor 1408 describing the condition and/or appearance of the plant, and/or a location 1410 of the plant.

The analysis component may optionally generate a set of watering instructions 1412 for a plant or plant type. The analysis component in other examples generates an update 1414 for a pre-existing set of watering instructions for a plant or plant type. The analysis component may also perform analysis of real-time data to generate the disposition instructions 1416 for a plant or plant type on the remote cloud server. The disposition instructions may include markdown instructions 1418 to reduce price of a plant/plant type. The disposition instructions include relocation instructions 1420 to remove a plant or plant type to a different location or reposition a plant in its current location.

In still other non-limiting examples, the cloud server performs analytics on real-time plant data to generate the ET rate 1422 and/or the ET score 1424. The cloud server 1400 transmits the status update 1404, set of watering instructions 1412, disposition instructions 1416, ET rate 1422 and/or ET score 1424 to the robotic rack-driver device via a network.

Figure 15:
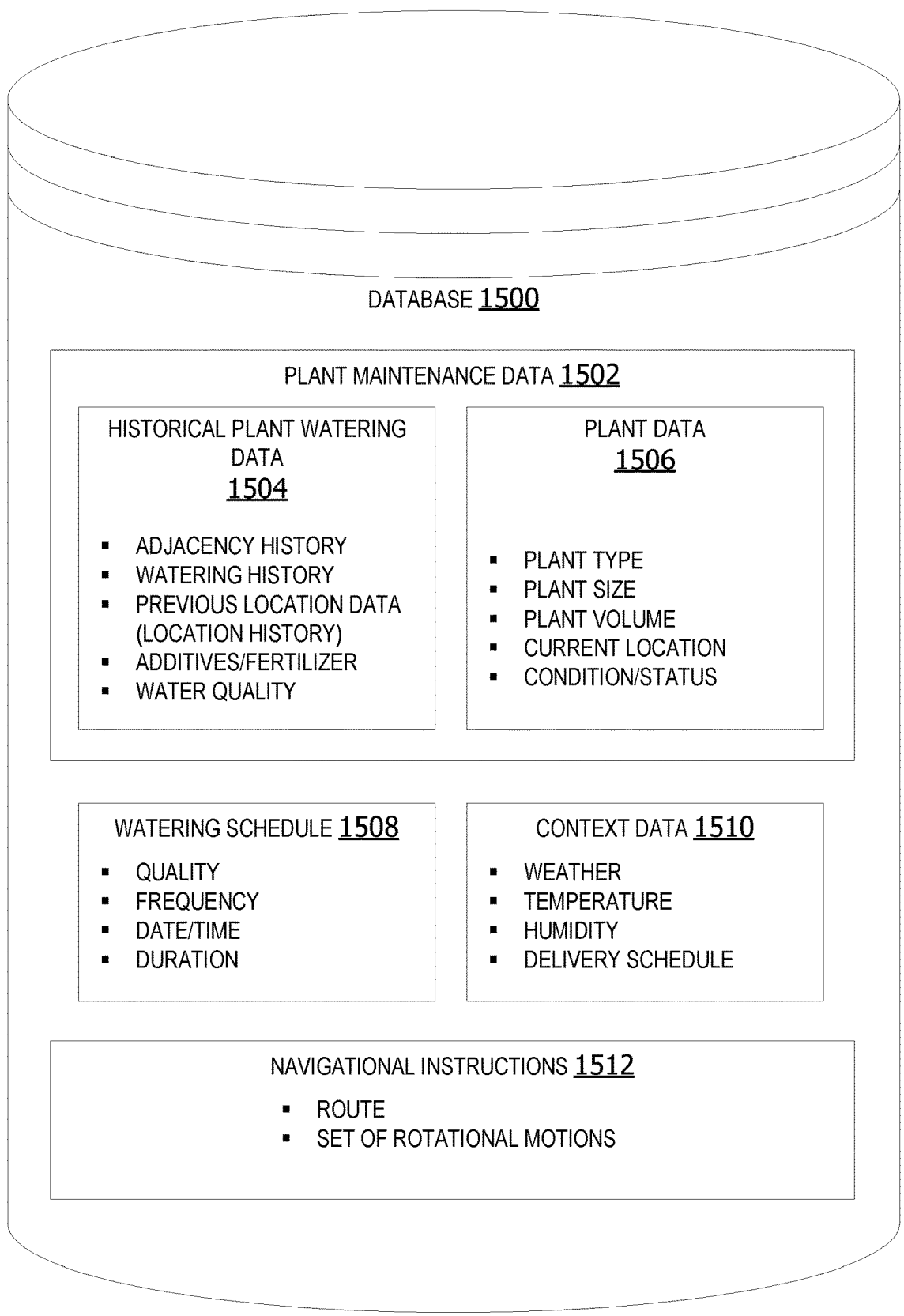
FIG. 15 is an exemplary block diagram illustrating a database for storing plant maintenance data.

FIG. 15 is an exemplary block diagram illustrating a database 1500 for storing plant maintenance data 1502. The plant maintenance data 1502 may include historical plant watering data 1504 and/or plant data 1506. The historical plant watering data may include adjacency history detailing other plants placed near or adjacent to the plant/plant type on a plant display. The historical plant watering data may include watering history, previous location data, additives/fertilizer added to water and/or water quality of water sprayed on the plants. Plant data 1506 may include plant type, plant size, plant volume (volume of pot/container, current location of plant in plant center, and/or condition or status of the plant.

Watering schedule 1508 includes details for a next scheduled watering of a plant/plant type or plants on a plant rack. The watering schedule may specify quantity of water to be sprayed, frequency of watering per day, frequency of watering per-week, frequency of watering per-month, date and/or time of the next scheduled watering, and/or duration of watering time.

Context data 1510 includes data describing current weather, temperature and/or humidity. The context data may also include delivery/shipment schedules detailing when new plants are scheduled for delivery to the plant center and/or the types of plants scheduled for delivery.

Navigational instructions 1512 optionally include one or more routes between a plant rack's current location and a watering zone. The route may also include a path from the watering zone to a previous location of the plant rack or a newly assigned location for the plant rack. A set of rotational motions in the navigation instructions specifies forward, backward, side-to-side and/or rotational (spinning) movements of the plant rack to be performed/carried out by the robotic rack-driver device to assist with even spreading of water across plants on the plant rack.

Figure 16:
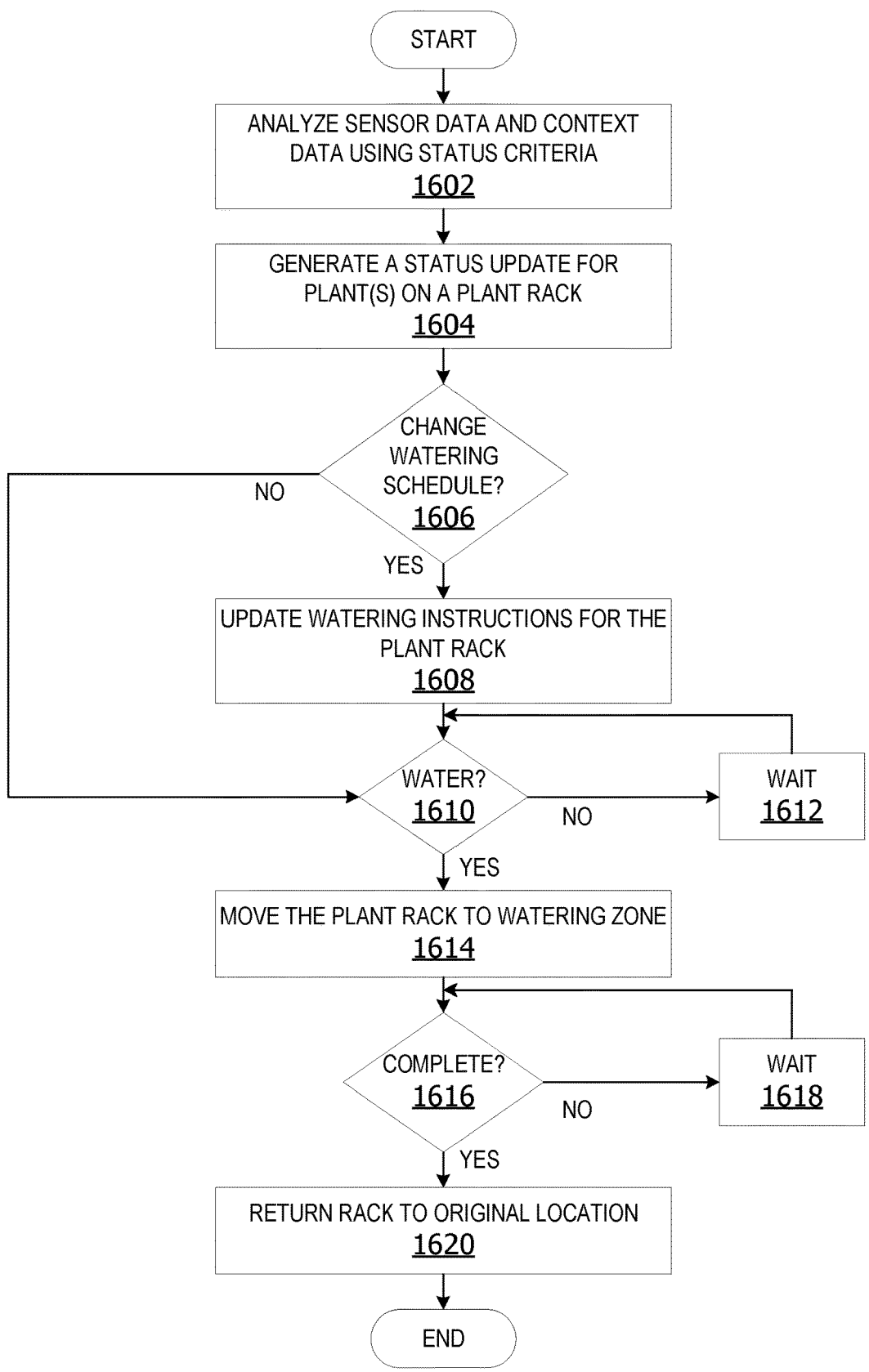
FIG. 16 is an exemplary flow chart illustrating operation of the computing device to water plants on a plant rack via a frame-mounted sprinkler device.

FIG. 16 is an exemplary flow chart illustrating operation of the computing device to water plants on a plant rack via a frame-mounted sprinkler device. The process shown in FIG. 16 may be performed by a computing device, such as the robotic rack-driver device in FIG. 1.

The process begins by analyzing sensor data and context data using status criteria at 1602. The robotic rack-driver device generates a status update for one or more plants on a plant rack at 1604. The robotic rack-driver device determines if a change in a watering schedule is needed at 1606. If yes, the robotic rack-driver device updates watering instructions for the plant rack at 1608. The robotic rack-driver device determines if it is time to water plants on the plant rack 1610. If no, the robotic rack-driver device waits 1612 until it is time to water the plants on the plant rack.

The robotic rack-driver device moves the plant rack to the water zone at 1614. The robotic rack-driver device determines if watering is complete at 1616. If no, the robotic rack-driver device waits until watering is completed. The robotic rack-driver device returns the plant rack to the plant rack's original location at 1620. The process terminates thereafter.

While the operations illustrated in FIG. 16 are performed by a computing device, aspects of the disclosure contemplate performance of the operations by other entities. For example, a cloud service may perform one or more of the operations shown in FIG. 16.

Figure 17:
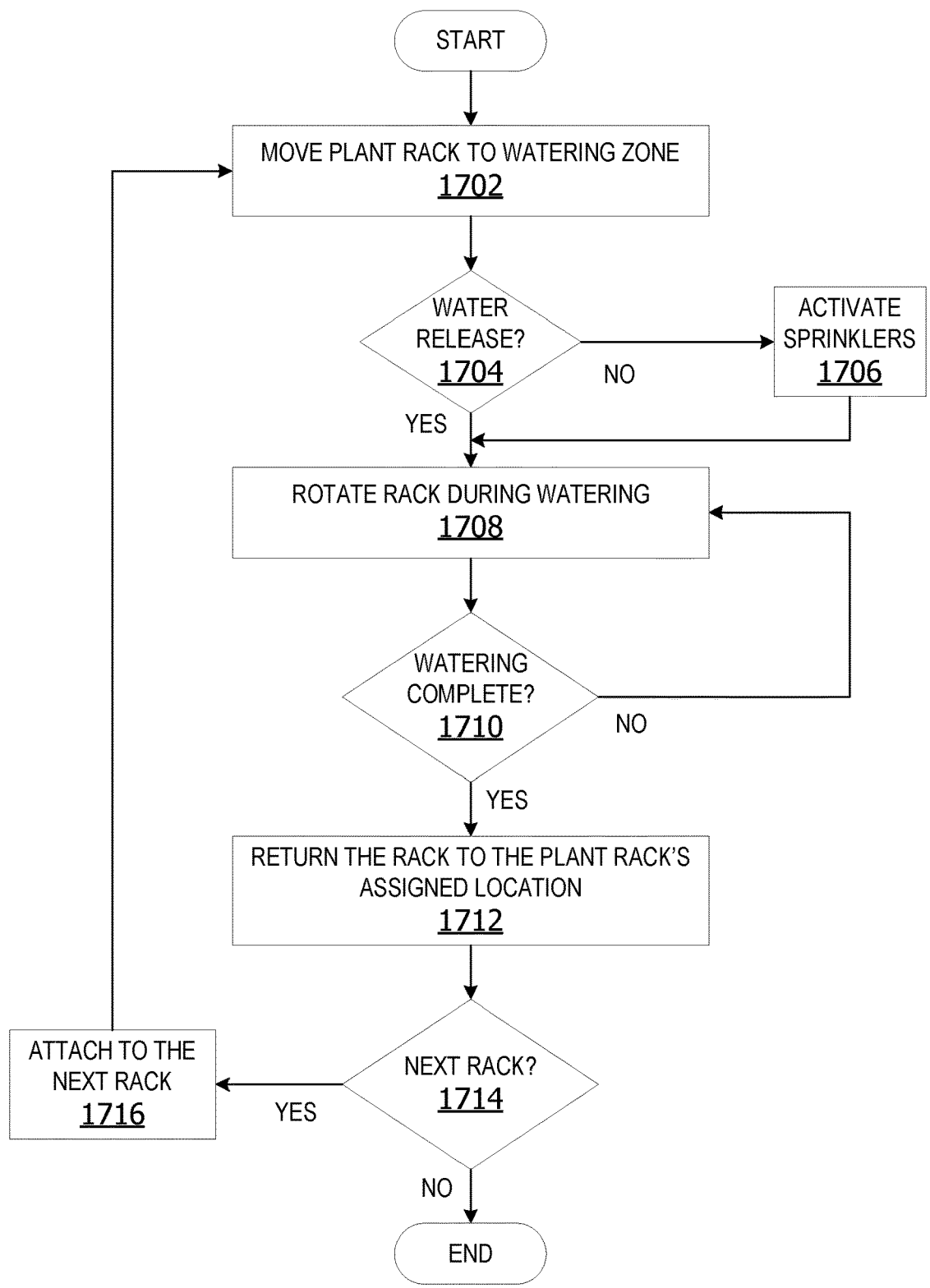
FIG. 17 is an exemplary flow chart illustrating operation of the computing device to maneuver a plant rack during watering via a robotic rack-driver device.

FIG. 17 is an exemplary flow chart illustrating operation of the computing device to maneuver a plant rack during watering via a robotic rack-driver device. The process shown in FIG. 17 may be performed by a computing device, such as the robotic rack-driver device in FIG. 1.

The process begins by moving a plant rack to a watering zone at 1702. The robotic rack-driver device determines if water is released from the sprinkler device at 1704. If no, the robotic rack-driver device sends a signal to activate the sprinklers at 1706. The robotic rack-driver device performs rotational motions during the watering cycle to rotate the plant rack during watering at 1708.

The robotic rack-driver device determines if watering is complete at 1710. If yes, the robotic rack-driver device returns the plant rack to the plant rack's assigned location at 1712. The robotic rack-driver device determines if it is time to water plants on a next plant rack at 1714. If yes, the robotic rack-driver device attaches to the next rack at 1716. The robotic rack-driver device iteratively performs operations 1702 through 1716 until there are no additional plant racks scheduled for watering at 1714. The process terminates thereafter.

While the operations illustrated in FIG. 17 are performed by a computing device, aspects of the disclosure contemplate performance of the operations by other entities. For example, a cloud service may perform one or more of the operations.

Additional Examples

In some examples, the system utilizes real-time weather data and other sensor data to forecast/predict watering requirements for plant and/or modify watering schedules for plants in a garden center. A robotic device moves plants on a rack through a watering frame when needed based on the real-time data. The system utilizes sensor devices to determine when a rack containing one or more plants is within a watering zone of the sprinkler device. The system also analyzes the sensor data (image data, scanner data, barcode data) to identify the type of plants on each rack.

In some examples, each type of plant or plant category has a different watering schedule and/or different additives added when watering. In one example, plants are placed into eight different plant type categories. Plants in each of the eight categories receives different amounts of water during watering. The plants in each category may also be watered with different frequency. For example, cacti may be watered less frequently than annuals. Likewise, plants in the category for annual flowers may be watered more frequently each day or each week than plants in the category for bushes. In other words, racks containing annuals are run through the sprinkler device more frequently than racks containing bushes or cacti.

In other examples, the system maintains a blockchain ledger associated with each rack/type of plant as a step in the chain of custody. In these examples, the system records date, time and frequency of watering, weather, and duration of watering/quantity of water placed on each plant. The blockchain record is maintained from day of delivery of the plant to the plant center all the way through final markdown and/or sale. The blockchain enables the system and/or a user to understand the path of the rack through the supply chain. In other words, the historical data/blockchain data identifies which grower/supplier provided the plant, how the plant was handled/maintained through the supply chain and store, when watering occurred, when fertilization occurred, type of fertilizer applied, quantity of water and/or fertilizer applied, any other additives/neutralizers applied, temperature exposures by the plant, etc. This data enables improved quality control and better maintenance of plants.

The system provides real-time updated watering of plants based on previous watering of the plants, current weather (temperature and humidity), water requirements for each type of plant, and/or other local environment conditions associated with the plant center where the plants are located.

The robotic rack-driver device in some examples downloads watering instructions and/or navigational directions from a cloud on a regular basis, such as, but not limited to, four to six times per day. The processing/analysis of real-tie data in this example occurs in the cloud server rather than on the robotic rack-driver device. The instructions identify which rack a robotic rack-driver device should attach to and take to the watering zone for watering. The robotic rack-driver device communicates via the network with the sprinkler device to initiate watering when the robotic rack-driver device arrives in the watering zone with the rack.

The robotic rack-driver device in other examples collects sensor data throughout the day. The sensor data may be stored on the robotic rack-driver device or uploaded to the cloud or other storage device. The uploaded data may include when plants on each rack are watered, how much they are watered (quantity), frequency of watering, temperature, humidity, heat off concrete, wind, frost, water quality, etc.

The barcode or other plant ID on a given plant may include historical information for the plant, such as, but not limited to, grower information, shipment dates, supplier, dates of arrival at the plant center, frequency of watering, time of day, etc. The robotic rack-driver device has real-time access to plant data (item data) on the store system, cloud server or other data storage.

The system determines the state of plants on each rack—if plants should be moved to clearance, moved to a location with more light/sun, increase watering frequency, etc. Machine vision analytics are utilized to determine the plant's condition—browning/yellowing foliage, presence of perforations, poor pot drainage, or other undesirable conditions. The system documents/records data associated with quality, infestations, wilting, yellowing, loss of foliage, bloom, dead heads, etc.

Alternatively, or in addition to the other examples described herein, examples include any combination of the following:

a set of navigational instructions generated by the plant maintenance component, the set of navigational instructions comprising at least one degree of rotation for turning the plant rack within the watering zone during the predetermined time-period in which the quantity of water is released onto the plant rack via the set of sprinklers associated with the frame-mounted sprinkler device;

a plurality of data sources providing the real-time context data associated with the live plant center, the plurality of data sources comprising at least one of a news feed, a weather feed and a shipping and receiving database;

a cloud server comprising an analysis component, the analysis component analyzing the real-time context data associated with the live plant center, the sensor data generated by the set of sensor devices within the live plant center and historical plant data associated with the plurality of plants using a set of per-plant maintenance rules to generate a status update for at least one plant in the plurality of plants on the plant rack;

the status update comprising at least one of a descriptor associated with a condition of the at least one plant, an appearance of the at least one plant and a current location of the at least one plant;

a cloud server comprising an analysis component;

the analysis component analyzing the real-time context data associated with the live plant center, the sensor data generated by the set of sensor devices within the live plant center and historical plant data associated with the plurality of plants using a set of per-plant maintenance rules;

the analysis component generates an updated set of watering instructions for the plant rack based on the analysis results;

the updated set of watering instructions including a date for a next watering of the plurality of plants on the plant rack, a time for the next watering, a duration of the next watering and a quantity of additives to be added to the quantity of water during the watering of the plant rack;

the analysis component generates disposition instructions for at least one plant in the plurality of plants based on the analysis results;

the disposition instructions comprising at least one of an instruction to markdown the at least one plant and an instruction to move the at least one plant to a different location;

wherein the set of sensor devices comprises at least one of a set of thermometers, a set of hygrometers, a set of pressure sensors, a set of weight sensors, a set of motion sensors, a set of image capture devices and a set of scanner devices;

the controller component, implemented on the at least one processor, wherein the controller component returns the plant rack to the assigned location of the plant rack on condition at least one sensor device on the robotic rack-driver device detects an absence of water released from the frame-mounted sprinkler device indicating completion of the predetermined watering duration;

a set of shelves for displaying at least one plant on each shelf in the set of shelves;

a set of water absorbent mats associated with the set of shelves, wherein at least one water absorbent mat is placed on each shelf in the set of shelves;

a set of drains associated with the frame-mounted sprinkler device rack to reclaim water draining off the plant rack;

a set of water reclamation reservoirs for storing reclaimed water captured by the set of drains;

a set of filters associated with the frame-mounted sprinkler device, wherein the set of filters remove particulate matter from the reclaimed water in the set of water reclamation reservoirs prior to re-using the reclaimed water to water at least one plant on a next plant rack;

releasing, by a sprinkler control component on the frame-mounted sprinkler device, the quantity of water onto the selected plant rack for the watering duration on condition at least one sensor on the frame-mounted sprinkler device detects a presence of the selected rack within the watering zone;

analyzing, by a cloud server, real-time weather data associated with the live plant center to generate an ET rate for the live plant center;

generating an ET score for each plant type on a plant rack in the plurality of plant racks within the live plant center based on the ET rate and plant data for each plant type, the plant data comprising watering history, plant state data, plant size, plant volume, adjacency history, location history and weather data;

driving, by the robotic rack-driver device, the selected rack in a selected direction, wherein the selected direction comprises at least one of a forward direction, a backward direction and a circular direction;

obtaining sensor data associated with at least one plant on the selected plant rack from at least one sensor device within the live plant center, wherein the at least one sensor device is located on the robotic rack-driver device, the frame-mounted sprinkler device or the selected plant rack;

removably connecting, by an attachment mechanism on the robotic rack-driver device, a portion of the robotic rack-driver device to a portion of the selected plant rack, wherein the robotic rack-driver device propels the selected plant rack via a motor on the robotic rack-driver device;

an analysis component implemented by at least one processor on the robotic rack-driver device that analyzes sensor data associated with at least a portion of a live plant center with real-time context data associated with a plurality of maneuverable plant racks using a set of plant maintenance rules to identify a selected plant rack for watering;

an attachment mechanism on the robotic rack-driver device couples to an attachment point on a portion of the selected plant rack;

an electric motor provides drive power to at least one wheel on the robotic rack-driver device, the selected plant rack along a pre-determined route from an assigned location of the selected plant rack to a watering zone associated with a selected frame-mounted sprinkler device;

a navigation component implemented on at least one processor generates navigation instructions for moving the selected plant rack through a set of rotational motions within the watering zone on condition the frame-mounted sprinkler device begins releasing water onto the selected plant rack;

the navigation component generates instructions to return the selected plant rack to the assigned location, by the robotic rack-driver device, on condition a duration watering assigned to the selected plant rack is completed; and the attachment mechanism releases a locking mechanism to release the selected plant rack from the robotic rack-driver device at the assigned location;

the controller component, implemented on the at least one processor, selects a next plant rack in the plurality of maneuverable plant racks due for watering;

the navigation component guides the robotic rack-driver device to an assigned location of the next plant rack;

the attachment mechanism of the robotic rack-driver device connects to an attachment point on a portion of the next plant rack;

the navigation component guides the robotic rack-driver device attached to the next plant rack to the watering zone associated with the selected frame-mounted sprinkler device, wherein the robotic rack-driver device waits until the frame-mounted sprinkler device releases a per-rack quantity of water onto the next plant rack;

the navigation component directs the robotic rack-driver device with the next plant rack to the assigned location of the next plant rack on condition watering is completed;

a regenerative braking system associated with a set of brakes is connected to at least one wheel on the robotic rack-driver device, wherein the regenerative braking system recharges a set of batteries providing power to an electric motor on the robotic rack-driver device; and a plant maintenance component implemented on the at least one processor updates an historical watering data record on a data storage to reflect completion of a watering task associated with the selected plant rack.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 may be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15.

In some examples, the operations illustrated in FIG. 16 and FIG. 17 may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for autonomously maintaining plants based on real-time data. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, such as when encoded to perform the operations illustrated in FIG. 16 and FIG. 17, constitute exemplary means for obtaining sensor data associated with at least one plant on the plant rack; exemplary means for analyzing the sensor data and real-time context data associated with the live plant center using a set of status criteria to generate an updated status of the at least one plant on the selected plant rack; exemplary means for updating a set of watering instructions for the selected plant rack; exemplary means for driving the robotic rack-driver device attached to a plant rack from a first location to a watering zone; exemplary means for detecting release of water onto the selected plant rack within the watering zone; exemplary means for initiating a set of rotational motions, by the robotic rack-driver device, maneuvering the selected plant rack within the watering zone to enable equal water distribution across the selected plant rack; and exemplary means for returning the selected plant rack to the assigned location of the plant rack on condition the at least one sensor detects a cessation of water emissions from the rack-mounted sprinkler device.

Other non-limiting examples provide one or more computer storage devices having a first computer-executable instructions stored thereon for providing autonomous plant-watering via a robotic device in a live plant center. When executed by a computer, the computer performs operations including analyzing sensor data, generating per-rack watering schedules based on condition of the plants and/or conditions within the live plant center and controlling release/timing of plant watering on a per-rack basis to conform with the customized watering schedule for each rack.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which may, for example, reflect generic background data. In an exemplary embodiment, KRG incrementally sequences all future undefined cached kernels of data to filter out data that may reflect generic background data. In an exemplary embodiment, KRG further incrementally sequences all future undefined cached kernels having encoded asynchronous data to filter out data that may reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for watering plants on a maneuverable rack, the system comprising:
   a plant rack in a live plant center, the plant rack comprising:
      a set of wheels connected to an underside of a shelf member;
      an attachment point connected to the underside of the shelf member between two or more wheels of the set of wheels;
   a robotic rack-driver device for moving the plant rack to a watering zone associated with a frame-mounted sprinkler device, the robotic rack-driver device comprising:
      an attachment mechanism provided on a side of the robotic rack-driver device and removably connects to the attachment point on the underside of the plant rack;
      a motor providing drive power to at least one wheel on the robotic rack-driver device to drive the plant rack along a route from an assigned location of the plant rack to the watering zone;
      a control device comprising at least one processor communicatively coupled to a memory;

an analysis component, implemented on the at least one processor, identifies a current state of at least one plant on the plant rack based on a result of an analysis of sensor data generated by at least one sensor device associated with the plant rack and real-time context data associated with the live plant center;

a plant maintenance component, implemented on the at least one processor, generates a set of maintenance instructions for watering a plurality of plants on the plant rack, the plurality of plants including the at least one plant;

a set of sensor devices on the frame-mounted sprinkler device detects a presence of the plant rack within the watering zone; and a sprinkler control component on the frame-mounted sprinkler device triggers release of a quantity of water onto the plant rack via a set of sprinklers for a predetermined watering duration specified in the set of maintenance instructions.

2. The system of claim 1, further comprising:
a set of navigational instructions generated by a navigational component, the set of navigational instructions comprising at least one degree of rotation for turning the plant rack within the watering zone while the quantity of water is released onto the plant rack via the set of sprinklers associated with the frame-mounted sprinkler device.

3. The system of claim 1, further comprising:
a plurality of data sources providing the real-time context data associated with the live plant center, the plurality of data sources comprising at least one of a news feed, a weather feed and a shipping and receiving database.

4. The system of claim 1, further comprising:
an analysis component, implemented on a cloud server, the analysis component analyzing the real-time context data associated with the live plant center, the sensor data generated by the set of sensor devices within the live plant center and historical plant watering data associated with the plurality of plants using a set of per-plant maintenance rules, wherein the set of per-plant maintenance instructions includes one or more of a next scheduled watering time, a quantity of water, and a duration of watering for the next scheduled watering time of the plurality of plants; and the analysis component generates a status update for at least one plant in the plurality of plants on the plant rack based on a result of the analysis, the status update comprising at least one of a descriptor associated with a condition of the at least one plant, an appearance of the at least one plant and a current location of the at least one plant.

5. The system of claim 1, further comprising:
an analysis component, implemented on a cloud server, analyzing the real-time context data associated with the live plant center, the sensor data generated by the set of sensor devices within the live plant center and historical plant data associated with the plurality of plants using a set of per-plant maintenance rules; and the analysis component generates an updated set of watering instructions for the plant rack based on a result of the analysis, the updated set of watering instructions including a date for a next watering of the plurality of plants on the plant rack, a time for the next watering, a duration of the next watering and a quantity of additives to be added to the quantity of water during the watering of the plant rack.

6. The system of claim 1, further comprising:
an analysis component, implemented on a cloud server, analyzes the real-time context data associated with the live plant center, the sensor data generated by the set of sensor devices within the live plant center and historical plant data associated with the plurality of plants using a set of per-plant maintenance rules; and the analysis component generates disposition instructions for at least one plant in the plurality of plants based on a result of the analysis, the disposition instructions comprising at least one of an instruction to markdown the at least one plant and an instruction to move the at least one plant to a different location.

7. The system of claim 1, wherein the set of sensor devices comprises at least one of a set of temperature sensors, a set of hygrometers, a set of pressure sensors, a set of weight sensors, a set of motion sensors, a set of image capture devices and a set of scanner devices.

8. The system of claim 1, further comprising:
a controller component, implemented on the at least one processor, wherein the controller component returns the plant rack to the assigned location of the plant rack on condition at least one sensor device on the robotic rack-driver device detects an absence of water released from the frame-mounted sprinkler device indicating completion of the duration for watering specified in the set of maintenance instructions.

9. The system of claim 1, wherein the plant rack further comprises:
a set of shelves for displaying at least one plant on each shelf in the set of shelves; and
a set of water absorbent mats associated with the set of shelves, wherein at least one water absorbent mat is placed on at least one shelf in the set of shelves.

10. The system of claim 1, further comprising:
a set of drains associated with the frame-mounted sprinkler device to reclaim water draining off the plant rack;
a water reclamation receptacle for storing reclaimed water captured by the set of drains; and
a set of filters associated with the frame-mounted sprinkler device, wherein the set of filters remove particulate matter from the reclaimed water in the water reclamation receptacle prior to re-using the reclaimed water to water at least one plant on a next plant rack.

11. The system of claim 1, wherein:
the attachment mechanism further comprises a locking mechanism, and
the at least one processor activates the locking mechanism to secure the plant rack to the robotic rack-driver device upon the attachment mechanism connecting to the attachment point on the underside of the plant rack.

12. The system of claim 11, wherein the at least one processor triggers a release of the locking mechanism upon the plant rack being returned to the assigned location by the robotic rack-driver device.

13. The system of claim 1, wherein the current state of the at least one plant on the plant rack includes one or more of whether the at least one plant is to be moved to clearance, whether the at least one plant is to be moved to a new location, or whether a watering frequency for the at least one plant is to be increased.

14. A method, comprising:
attaching, via an attachment mechanism of a robotic rack-driver device, the attachment mechanism to an attachment point of a plant rack in a live plant center, wherein the attachment point is connected to an underside of a shelf member between two or more wheels of a set of wheels connected to the underside of the shelf member, and wherein the attachment mechanism is provided on a side of the robotic rack-driver device and removably connects to the attachment point on the underside of the plant rack;

providing, via a motor, drive power to at least one wheel on the robotic rack-driver device to drive the plant rack along a route from an assigned location of the plant rack to the watering zone;

identifying, by an analysis component implemented on the robotic rack-driver device, a current state of at least one plant on the plant rack based on a result of an analysis of sensor data generated by at least one sensor device associated with the plant rack and real-time context data associated with the live plant center;

generating, by a plant maintenance component implemented on the robotic rack-driver device, a set of maintenance instructions for watering a plurality of plants on the plant rack, the plurality of plants including the at least one plant;

receiving, from a sprinkler control component of a frame-mounted sprinkler device, a quantity of water onto the plant rack according to a predetermined watering duration specified in the generated set of maintenance instructions, wherein the quantity of water is received in response to a set of sensor devices on the frame-mounted sprinkler device detecting a presence of the plant rack within the watering zone.

15. The method of claim 14, further comprising:
generating, by a navigational component implemented on the robotic rack-driver device, a set of navigational instructions comprising at least one degree of rotation for turning the plant rack within the watering zone while the quantity of water is released onto the plant rack via the set of sprinklers associated with the frame-mounted sprinkler device.

16. The method of claim 14, further comprising:
driving the plant rack back to the assigned location of the plant rack based at least in part on at least one sensor device on the robotic rack-driver device detecting an absence of water released from the frame-mounted sprinkler device indicating completion of the duration for watering specified in the set of maintenance instructions.

17. The method of claim 14, further comprising:
driving the plant rack to a new location following the duration of the watering.

18. The method of claim 14, further comprising:
outputting, by a user interface implemented on the robotic rack-driver device, an alert.

19. The method of claim 14, further comprising:
receiving and storing, on an on-board data storage device, an updated set of watering instructions for the plant rack, the updated set of watering instructions including a date for a next watering of the plurality of plants on the plant rack, a time for the next watering, a duration of the next watering and a quantity of additives to be added to the quantity of water during the watering of the plant rack.

20. The method of claim 14, further comprising:
receiving and storing, on an on-board data storage device, disposition instructions for at least one plant in the plurality of plants, the disposition instructions comprising at least one of an instruction to markdown the at least one plant and an instruction to move the at least one plant to a different location.

* * * * *